US008695049B2

(12) United States Patent
Maruyama et al.

(10) Patent No.: US 8,695,049 B2
(45) Date of Patent: Apr. 8, 2014

(54) CONTENT SWITCHING APPARATUS AND CONTENT SWITCHING METHOD

(75) Inventors: Kazuna Maruyama, Fuchu (JP); Shuntaro Aratani, Machida (JP); Eito Sakakima, Tokyo (JP); Satoshi Ukawa, Komae (JP); Satoshi Hanamitsu, Kawasaki (JP); Koji Mito, Kawasaki (JP); Yuuka Fujinaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 878 days.

(21) Appl. No.: 12/407,003

(22) Filed: Mar. 19, 2009

(65) Prior Publication Data
US 2009/0249410 A1 Oct. 1, 2009

(30) Foreign Application Priority Data
Mar. 25, 2008 (JP) ................................. 2008-077406

(51) Int. Cl.
*H04N 7/173* (2011.01)
(52) U.S. Cl.
USPC .................. 725/93; 725/86; 725/87; 725/94; 725/116
(58) Field of Classification Search
None
See application file for complete search history.

(56) References Cited

U.S. PATENT DOCUMENTS

| 2007/0061852 | A1* | 3/2007 | Hagiwara | 725/88 |
| 2007/0124754 | A1* | 5/2007 | Miyauchi et al. | 725/8 |
| 2011/0035775 | A1* | 2/2011 | Patel et al. | 725/59 |

FOREIGN PATENT DOCUMENTS

JP 2006-270722 A 10/2006

OTHER PUBLICATIONS

The above reference was cited in a Jun. 19, 2012 Japanese Office Action, which is enclosed without an English Translation, that issued in Japanese Patent Application No. 2008-077406.

* cited by examiner

*Primary Examiner* — Nasser Goodarzi
*Assistant Examiner* — Fred Peng
(74) *Attorney, Agent, or Firm* — Cowan, Liebowitz & Latman, P.C.

(57) ABSTRACT

The content switching apparatus includes at least a position identifying unit (800) and a play control unit (700). In switching from a first content (broadcast program) to a second content (VOD content), the position identifying unit identifies the position of the image in the second content, the image being the same as the first image of the first content. The play control unit determines a play starting position in the second content based on the position identified by the position identifying unit. By determining the play starting position of the second content in this way, the image can be properly switched even in the case where the time length or the content configuration is different.

23 Claims, 21 Drawing Sheets

FIG.5

| | SCENE STARTING TIME | | SCENE DURATION |
|---|---|---|---|
| | BROADCAST PROGRAM | VOD CONTENT | |
| (a) | 00:00:00 | --- | 00:01:00 |
| | 00:01:00 | 00:00:00 | 00:04:00 |
| (b) | 00:05:00 | 00:04:00 | 00:08:00 |
| | 00:13:00 | --- | 00:01:00 |
| | 00:14:00 | 00:12:00 | 00:08:00 |
| | 00:22:00 | --- | 00:01:00 |
| | 00:23:00 | 00:20:00 | 00:07:00 |

IN: HOUR:MIN:SEC

FIG.12

| PRESENT TIME | VOD OFFSET ||
| --- | --- | --- |
|  | TIME | POLARITY |
| 19:00:00 | 00:00:00 | AHEAD |
| 19:01:00 | 00:01:00 | AHEAD |
| (a) 19:02:00 | 00:01:00 | AHEAD |
| 19:13:00 | 00:01:00 | AHEAD |
| 19:14:00 | 00:02:00 | AHEAD |
| 19:15:00 | 00:02:00 | AHEAD |
| 19:22:00 | 00:02:00 | AHEAD |
| (b) 19:23:00 | 00:03:00 | AHEAD |
| 19:24:00 | 00:03:00 | AHEAD |
| 19:30:00 | 00:03:00 | AHEAD |

IN HOUR:MIN:SEC

FIG. 16

```
<TVAMain>
 <ProgramDescription>

<SegmentInformationTable>                                    (a)
   <SegmentList>
```

| <SegmentInformation segmentId='SC1'><br><ProgramRef crid="crid://ch100.com/drama/Typical Drama"/><br><Description><br> <Title>OPENING</Title><br></Description><br><SegmentLocator><br> <MediaRelIncrTimePoint>0</MediaRelIncrTimePoint><br> <MediaIncrDuration>240</MediaIncrDuration><br></SegmentLocator><br></SegmentInformation> |
|---|
| SEGMENT INFORMATION OF MAIN PART 1 |
| SEGMENT INFORMATION OF MAIN PART 2 |
| SEGMENT INFORMATION OF ENDING |

```
   </SegmentList>
  </SegmentInformationTable>

</ProgramDescription>
</TVAMain>
```

FIG.17

```
<TVAMain>
 <ProgramDescription>

<SegmentInformationTable>
   <SegmentList>

<SegmentInformation segmentId='AD1'>
      <ProgramRef crid="crid://ch100/Typical Drama"/>
      <Description>
       <Title>CM1</Title>
      </Description>
      <SegmentLocator>
       <MediaRelIncrTimePoint>0</MediaRelIncrTimePoint>
       <MediaIncrDuration>60</MediaIncrDuration>
      </SegmentLocator>
      </SegmentInformation>
```

(b)

```
      <SegmentInformation segmentId='SC1'>
      <ProgramRef crid="crid://ch100/Typical Drama"/>
      <Description>
       <Title>OPENING</Title>
      </Description>
      <SegmentLocator>
       <MediaRelIncrTimePoint>60</MediaRelIncrTimePoint>
       <MediaIncrDuration>240</MediaIncrDuration>
      </SegmentLocator>
      </SegmentInformation>
```

| SEGMENT INFORMATION OF MAIN PART 1 |
|---|
| SEGMENT INFORMATION OF CM 2 |
| SEGMENT INFORMATION OF MAIN PART 2 |
| SEGMENT INFORMATION OF CM 3 |
| SEGMENT INFORMATION OF ENDING |

```
   </SegmentList>
  </SegmentInformationTable>

</ProgramDescription>
</TVAMain>
```

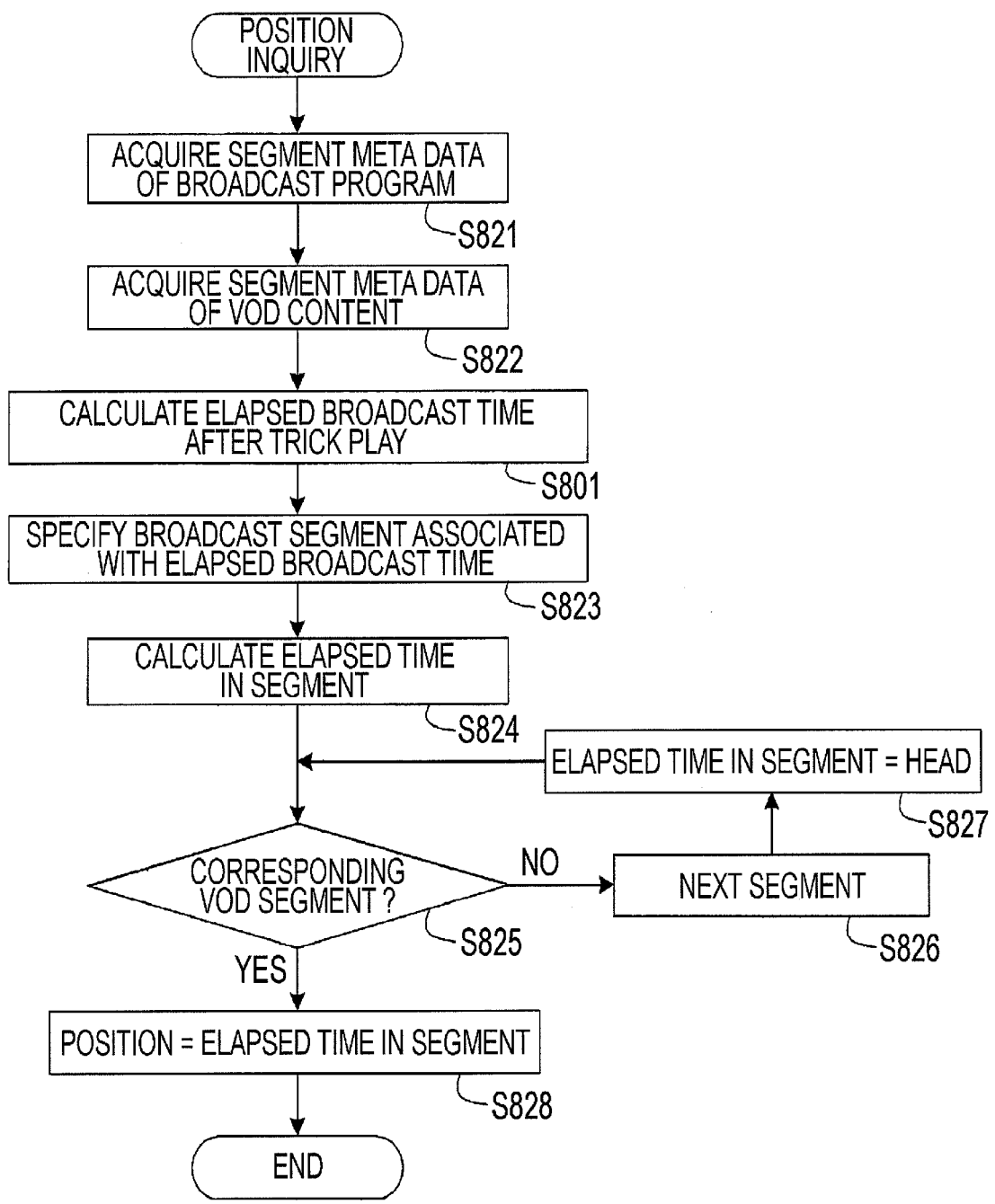

CONTENT SWITCHING APPARATUS AND CONTENT SWITCHING METHOD

BACKGROUND OF THE INVENTION

1. Field of the Invention

This invention relates to a technique for switching real-time broadcasting and video contents.

2. Description of the Related Art

The video-on-demand (VOD) permitting the user to view the desired content at the desired time is spreading. In VOD, the video contents of movies and TV dramas broadcast in the past are distributed.

A further extension of VOD in the future is expected to realize the simultaneous distribution of a VOD content and a broadcast program. The time will come when the user, interested in a broadcast program tuned in midway, for example, can view the particular program from the beginning by switching to VOD mode. Also, the user, if desirous of performing such operation as rapid feed or skipping while viewing a broadcast program, can view the unbroadcast part of the broadcast program by switching to VOD mode. In other words, the user may be able to freely manipulate and view the real-time broadcast program in the same way as a recorded program.

Japanese Patent Application Laid-Open (JP-A) No. 2005-136974 discloses a method of switching the viewing mode from the broadcast program to the VOD content. JP-A No. 2005-136974 describes a method of acquiring the same VOD content as the program being broadcast from an archive and viewing an unrecorded part by rewinding or an unbroadcast part by rapid feed.

SUMMARY OF THE INVENTION

The time length or the content configuration is not necessarily coincident entirely between the VOD content and the corresponding broadcast program. In the case where a commercial message (CM) is cut off, for example, the VOD content may become shorter than the corresponding broadcast program in time length. Conversely, the VOD content may be longer than the broadcast program in time length as the result of adding a scene cut off in the broadcast program. Even if the time length is the same, on the other hand, a different position at which a CM is inserted or a different way of scene compilation may result in a different content configuration. In the case where the time length or the content configuration is incoincident for these reasons, a difference may rise in scene progress between the VOD content and the broadcast program.

In the conventional method of switching the broadcast program to the VOD content, however, the position at which the VOD content starts to be played is determined simply from the viewing position of the broadcast program and an offset value ("+15 seconds", for example, if skipped 15 seconds ahead). As a result, the position at which the VOD content starts to be played is sometimes different from the starting position expected (designated) by the user. In the case where the scene progress of the broadcast program is 30 seconds behind due to an inserted CM, for example, the user designation of a +15-second skip would start to play the VOD content from the scene 45 seconds ahead. In the case where the scene progress of the broadcast program is 30 seconds ahead and the user designates the skip of +15 seconds, on the other hand, the VOD play would be started from the scene 15 seconds behind already viewed by the user.

This invention is achieved in view of this situation, and an object thereof is to provide a technique for properly switching the content different in time length or content configuration.

According to a first aspect of the invention, there is provided a content switching apparatus for switching an image of a first content being broadcasted into an image of a second content recorded (or stored) and including the same image as the first content, comprising: a position identifying unit which identifies a position of an image in the second content, the image being the same as a first image of the first content; and a play control unit which determines a play starting position to start to play the second content based on the position identified by the position identifying unit.

According to a second aspect of the invention, there is provided a content switching method for switching an image of a first content being broadcasted into an image of a second content recorded and including the same image as the first content, comprising the steps of: identifying a position of an image in the second content, the image being the same as a first image of the first content; and determining a play starting position to start to play the second content based on the position identified in the position identifying step.

The present invention provides a technique for properly switching the content different in time length or content configuration. Further features of the present invention will become apparent from the following description of exemplary embodiments with reference to the attached drawings.

BRIEF DESCRIPTION OF THE DRAWINGS

FIG. 5 shows an example of a progress correspondence table according to the first embodiment;

FIG. 12 shows an example of the VOD offset according to the second embodiment;

FIG. 16 shows an example of the segment meta data of the VOD according to the third embodiment;

FIG. 17 shows an example of the segment meta data of a broadcast program according to the third embodiment;

FIG. 18 is a flowchart of the process executed by a position identifying unit 802 according to the third embodiment;

DESCRIPTION OF THE EMBODIMENTS

General Description of Embodiments

Figure 1:
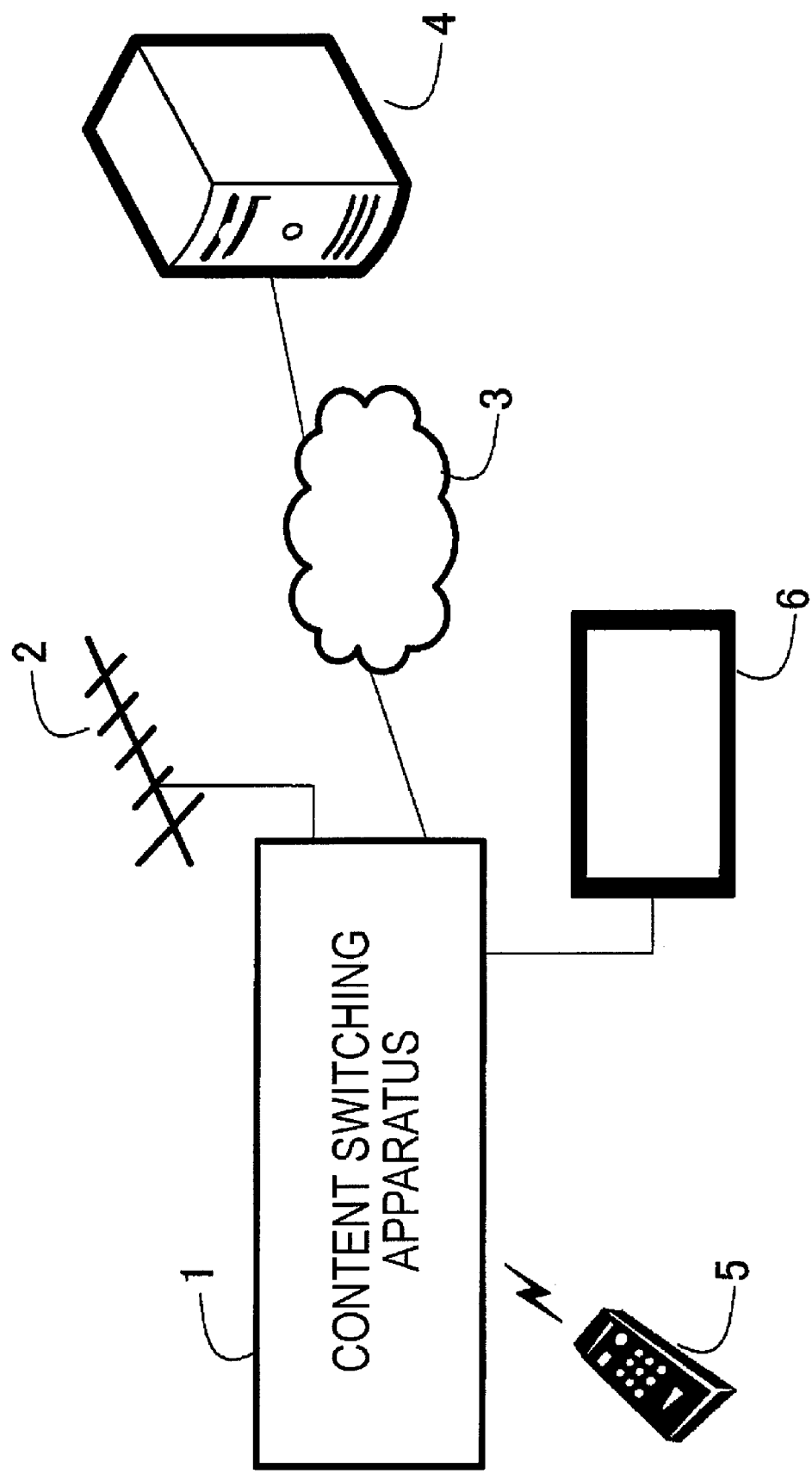
FIG. 1 is a diagram showing the general configuration of a video display system.

The content switching apparatus according to the embodiments of this invention is adapted to output both the content being broadcasted (first content) and the content recorded (stored) (second content). The first content is defined as the content distributed through the terrestrial broadcast, the satellite broadcast, cable TV network and the IP broadcast and can be viewed only in real time (i.e. the play position and the play speed thereof cannot be changed). The second content is defined as the content which is recorded in a recording medium such as a magnetic tape, a magnetic disk, an optical disk, a magnetooptic disk or a semiconductor memory and of which the play position and the play speed can be freely controlled. Examples of the second content include the VOD content supplied from the content archive such as the VOD server, the video content that can be downloaded from the video site or the recorded content obtained by recording the first content.

The content switching apparatus has the function of switching the image of the first content to the image of the second content including the same image as the first content. The "same (identical) image" is not necessarily coincident in its entirety but may be somewhat different in image quality such as resolution, compression rate or tone. Specifically, the "same (identical) image" is defined as an image substantially identical as viewed from the user. The first content and the second content may be identical not wholly but at least partially. Typically, the first content and the second content are not coincident with each other completely but often different in time length or content configuration.

In the case where the first content and the second content are different in time length or content configuration, the image progress is displaced between the first content and the second content. In the case where the play start position of the second content is determined based on the viewing time of the first content, therefore, the image may not be properly switched.

In view of this, the content switching apparatus according to this embodiment includes at least a position identifying unit and a play control unit. In switching from the first content to the second content, the position identifying unit identifies a particular position in the second content at which the image corresponding to a first image of the first content is located. The term "position" of this invention means a temporal position in the content. For example, the "position at one minute after the start of the content" corresponds to the point at the time of one minute elapse from the start (head) of the content. Therefore, the position can be denoted by elapsed time from a predetermined reference time in the content. Or, an identification number of each of frames constituting the content can be used as information designating the position in the content. The content is a set of a plurality of image frames, and therefore, "the position identifying unit identifies a particular position in the second content at which the image corresponding to a first image of the first content is located" means that the position identifying unit identifies (detects) the frame in the second content which is the same as the frame of the first image of the first content. Then, the play control unit, based on the position identified by the position identifying unit, determines the play starting position at which the second content starts to be played. By determining the play starting position of the second content in this way, the image can be properly switched even in the case where the time length or the content configuration is different.

The content switching apparatus includes a user interface unit (request receiving unit) for receiving the change request from the user to change the play position or the play speed. The change request to change the play position includes the play command designating the absolute position such as the scene designation (chapter designation), the play command designating the relative position such as the skip +15 seconds or −30 seconds. The change request to change the play speed, on the other hand, includes the rapid feed, rewind, the frame feed and the pause.

The play position or the play speed of the second content can be changed freely. In contrast, the first content can be viewed only in real time and the play position or the play speed thereof cannot be changed. Therefore, the content switching apparatus, upon reception of the change request from the user during the output of the first content, automatically switches the image from the first content to the second content. Without being conscious of the content type on the part of the user, therefore, the broadcast content can be handled in the same manner as if it is the recorded content. Incidentally, the second content is desirably downloaded or recorded before or in parallel to (in the background) the viewing of the first content. By doing so, the first content can be switched to the second content as soon as the change request is received.

In the play position change request, the image of the first content immediately before switch is not identical with the image of the second content after switch. In the case of the skip command of +15 seconds, for example, the image of the second content is required to be 15 seconds ahead of the image of the first content immediately before switch. In the case where the position is identified assuming the image of the first content immediately before switch as "the first image", therefore, the play control unit determines the play start position of the second content by adding 15 seconds to the position identified by the position identifying unit (the position of the image identical with the first image). Nevertheless, "the image 15 seconds later than the same image as the first image" in the second content is not always identical with "the image 15 seconds later than the first image" in the first content. Preferably, therefore, the position is identified by regarding, as "the first image", "the image to be output in the first content on the assumption that the play position or the play speed of the first content is changed in accordance with the change request". Specifically, the image switching position can be determined more properly by considering the play position change on the part of the first content before the position identification. The first to third embodiments represent the latter method, while the fourth embodiment employs the former method.

Figure 7:
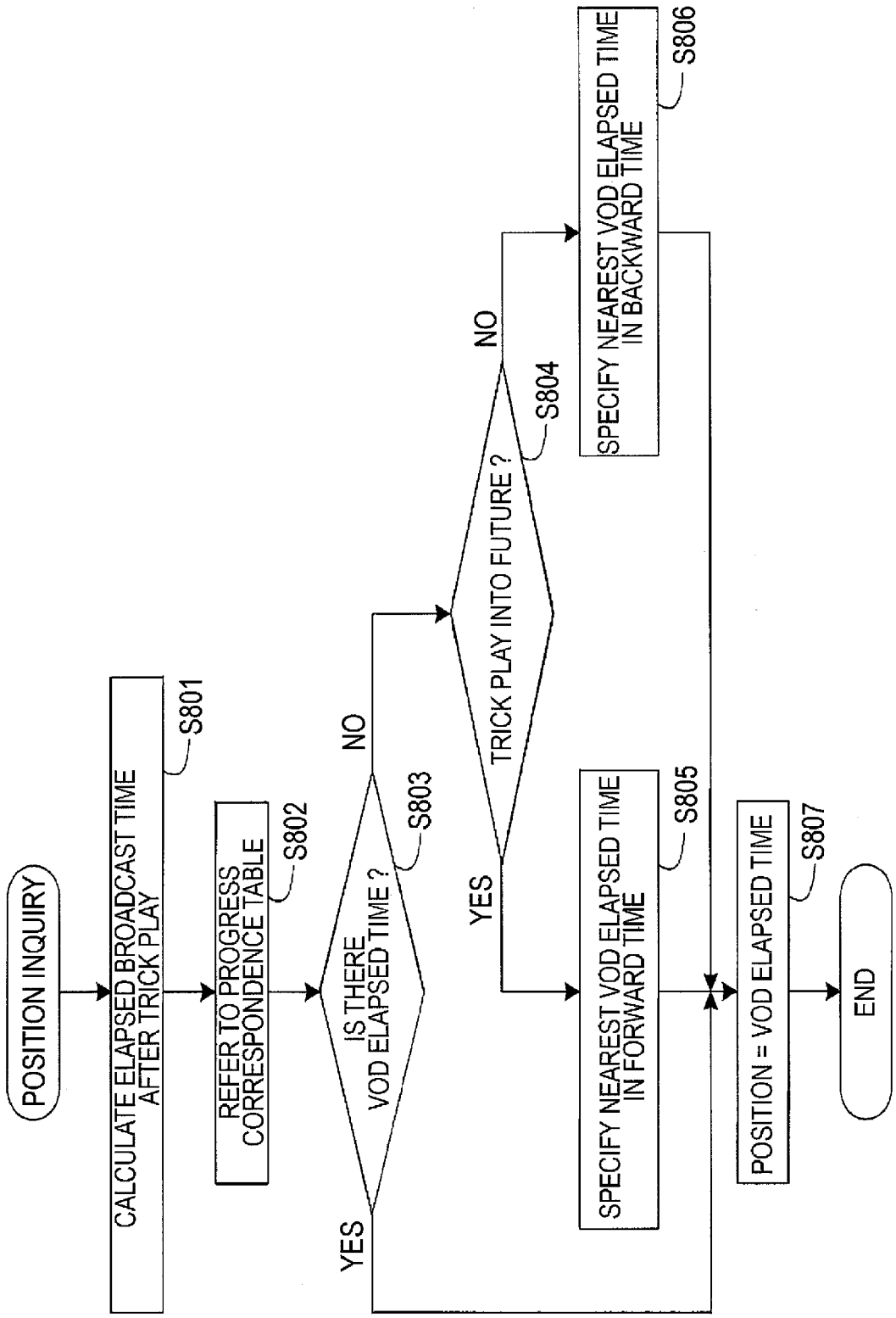
FIG. 7 is a flowchart showing the process executed by a position identifying unit 800 according to the first embodiment.

In the case where the second content has (contains) no image corresponding to the first image, the position identifying unit preferably searches for the image contained (existent) in the second content from images before or after the first image in the first content (first embodiment, FIG. 7). In the case where the change request is to advance the play position (skip in positive direction, rapid feed, etc.), the image is preferably searched for from the images after the first image.

In the case where the change request is to back the play position (skip in negative direction, rewind, etc.), the image is preferably searched for from the images before the first image. As a result, the sense of incongruity due to the image switching can be minimized.

The position identifying unit can identify the position by referring to the definition information defining the temporal relative positions between the images of the first and second contents. The definition information preferably defines the correspondence between the time length and the starting time of each segment of the first and second contents (for example, the progress correspondence table of the first embodiment or the segment meta data of the third embodiment). Also, the information which defines the offsets of the positions in the second content corresponding to plural positions in the first content is preferably used as the definition information (for example, the VOD offset information in the second embodiment). The content switching apparatus may acquire the definition information from the broadcast wave or the content distribution server such as the VOD server.

Also, the position identifying unit can identify the position by image matching between the first image and the image in the second content (fourth embodiment). Incidentally, any well-known method may be used for the image matching.

In order to reduce the processing time of image matching, the checking range (search range) for image matching is preferably as small as possible. In the case where the time length of the second content is longer than that of the first content, for example, the position identifying unit preferably determines the checking range for the image matching from the part A and subsequent seconds in the second content. The "A seconds" is longer than zero, and the position A seconds is the position of the first image in the first content. As a result, the part before A seconds can be removed from the checking range. In the case where the time length of the second content is shorter than that of the first content, on the other hand, the position identifying unit preferably determines the checking range for image matching from the part A and preceding seconds in the second content. As a result, the part after A seconds can be removed from the checking range.

More preferably, in the case where the second content is B seconds longer than the first content (B>0), the position identifying unit determines the checking range for the image matching from the part A seconds to (A+B) seconds in the second content. By limiting the checking range to the part of B seconds from A seconds to (A+B) seconds, the image matching process is can be greatly improved in efficiency. Similarly, in the case where the second content is C seconds shorter than the first content (C>0), the part (A−C) seconds to A seconds in the second content is preferably determined as the checking range for the image matching. Further, in the case where a D-second CM (C>D>0) is included in the range from the head of the first content to the first image, the position identifying unit preferably determines the checking range for the image matching in the part (A−C) seconds to (A−D) seconds in the second content. As a result, the checking range can be further reduced for an improved image matching efficiency.

The first image to be subjected to the image matching is not preferably a CM (commercial message) image. This is because a CM is not necessarily included in the second content. The content switching apparatus, therefore, preferably includes a storing unit for temporarily storing the image of the first content to store the nearest non-CM image. In the case where the present image of the first content is not the CM, the position identifying unit may use the present image as the first image. In the case where the present image of the first content is the CM, on the other hand, the position identifying unit may use the image (non-CM image) immediately before the CM, which is stored in the storing unit, as the first image. In this way, the reliability of the image matching operation is improved.

Preferred embodiments of the invention are illustratively described in detail below with reference to the drawings. First, with reference to FIGS. 1 and 21, the general configuration of the video display system and the internal configuration of the content switching apparatus are described. After that, the first to fourth embodiments are described as specific examples.

(Explanation of FIG. 1)

FIG. 1 shows the general configuration of the video display system according to an embodiment of the invention. This video display system is configured of a content switching apparatus 1 and a monitor 6.

The content switching apparatus 1 can receive the broadcast wave from a broadcasting station (not shown) through an antenna 2 on the one hand and the VOD content from a VOD server 4 (content archive) through a network 3 on the other hand. Also, the content switching apparatus 1, by receiving the operation information from a remote controller 5, selects the channel, reproduces the VOD content or displays the menu screen.

Figure 21:
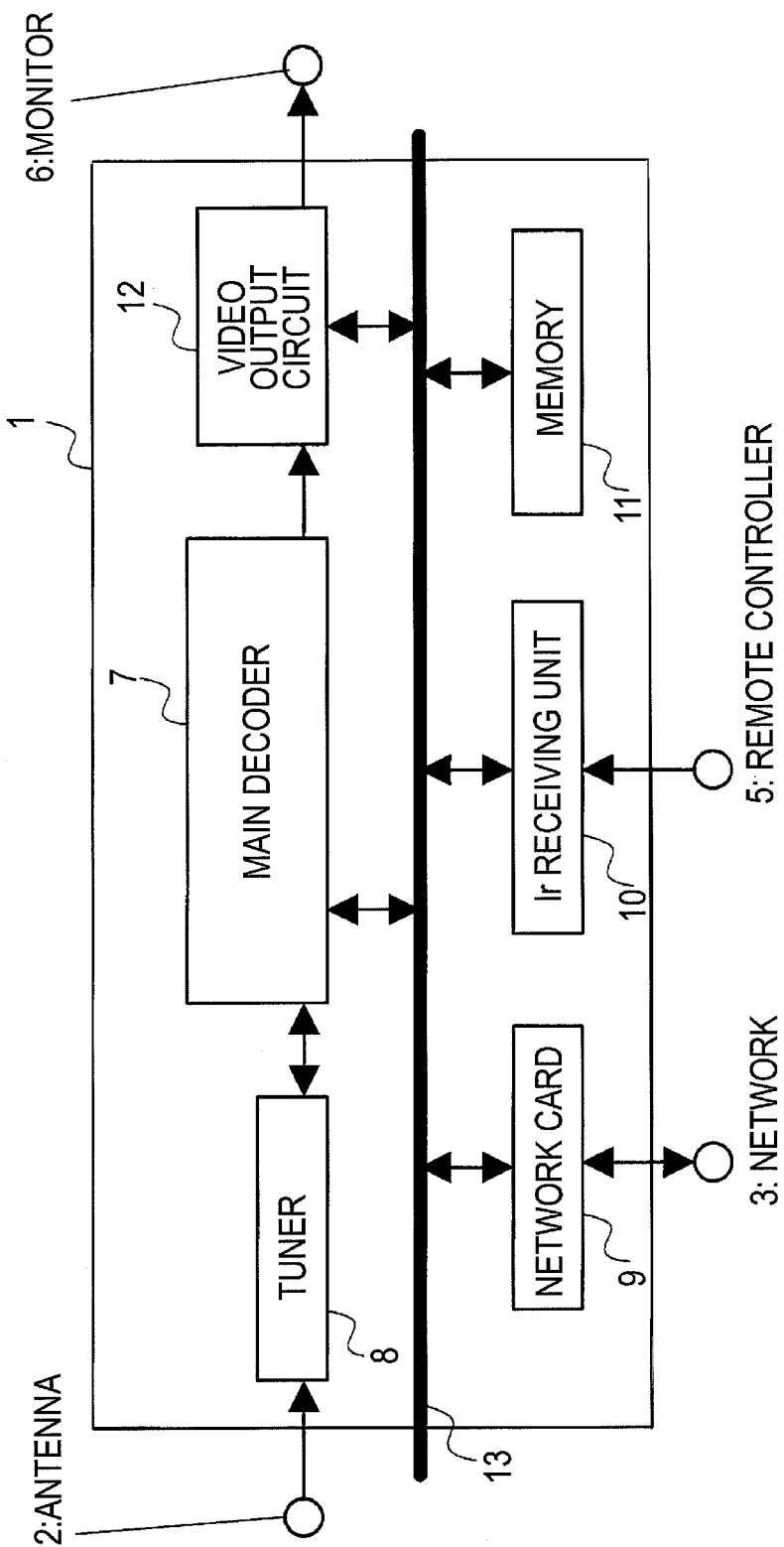
FIG. 21 is a block diagram showing the internal configuration of the content switching apparatus.

(Explanation of FIG. 21)

FIG. 21 is a block diagram showing the internal configuration of the content switching apparatus 1 of FIG. 1.

A main decoder 7 receives the video and audio data from a tuner 8 and a network card 9 and outputs the video signal to a video output circuit 12 while at the same time outputting the audio signal to an audio output circuit (not shown). The main decoder 7 analyzes and separates the received video and audio data, and decodes the encoded data. Also, the main decoder 7 performs such control operation as to change the play method in accordance with the internal state of the content switching apparatus 1 and the state of the signal input from an external source. Incidentally, the signal input from an external source is the user designation or command through the remote controller 5.

The tuner 8 executes the process of receiving the broadcast wave and retrieving the broadcast signal. The tuner 8, upon reception of the designation of a channel of a specified frequency from the image decoder 7, is tuned to the particular frequency thereby to extract and transfer the broadcast signal contained in the frequency to the main decoder 7. In the digital TV in general, the tuner 8 is a terrestrial digital broadcast tuner or a BS/broadband CS digital broadcast tuner.

The network card 9 is a block constituting an interface with the network 3. The VOD content is transmitted to the main decoder 7 through the network card 9.

An infrared light receiving unit (Ir receiving unit) 10 receives the infrared light signal transmitted from the remote controller 5 and transmits the received signal to the main decoder 7. Although this embodiment represents a case in which the signal is received from the remote controller 5 by infrared light, the invention is not limited to such a case.

The memory 11 temporarily stores the data generated by the main decoder 7 and other constituent circuits. The SRAM (static random access memory), the DRAM (dynamic random access memory), the flash memory and the EEPROM (electronically erasable programmable read-only memory) are specific examples of the memory 11.

The video output circuit 12 receives the video signal output from the main decoder 7, and outputs by converting the video signal into a format suitable for the monitor 6. Also, the video output circuit 12 controls the output video signal and outputs the video signal to the monitor 6 in accordance with the output frame rate.

The internal bus 13 is for data transmission/reception to and from the constituent blocks in the content switching apparatus 1.

<First Embodiment>

The first embodiment of the invention realizes the positioning between the broadcast program and the VOD content by utilizing the progress correspondence table.

Figure 2:
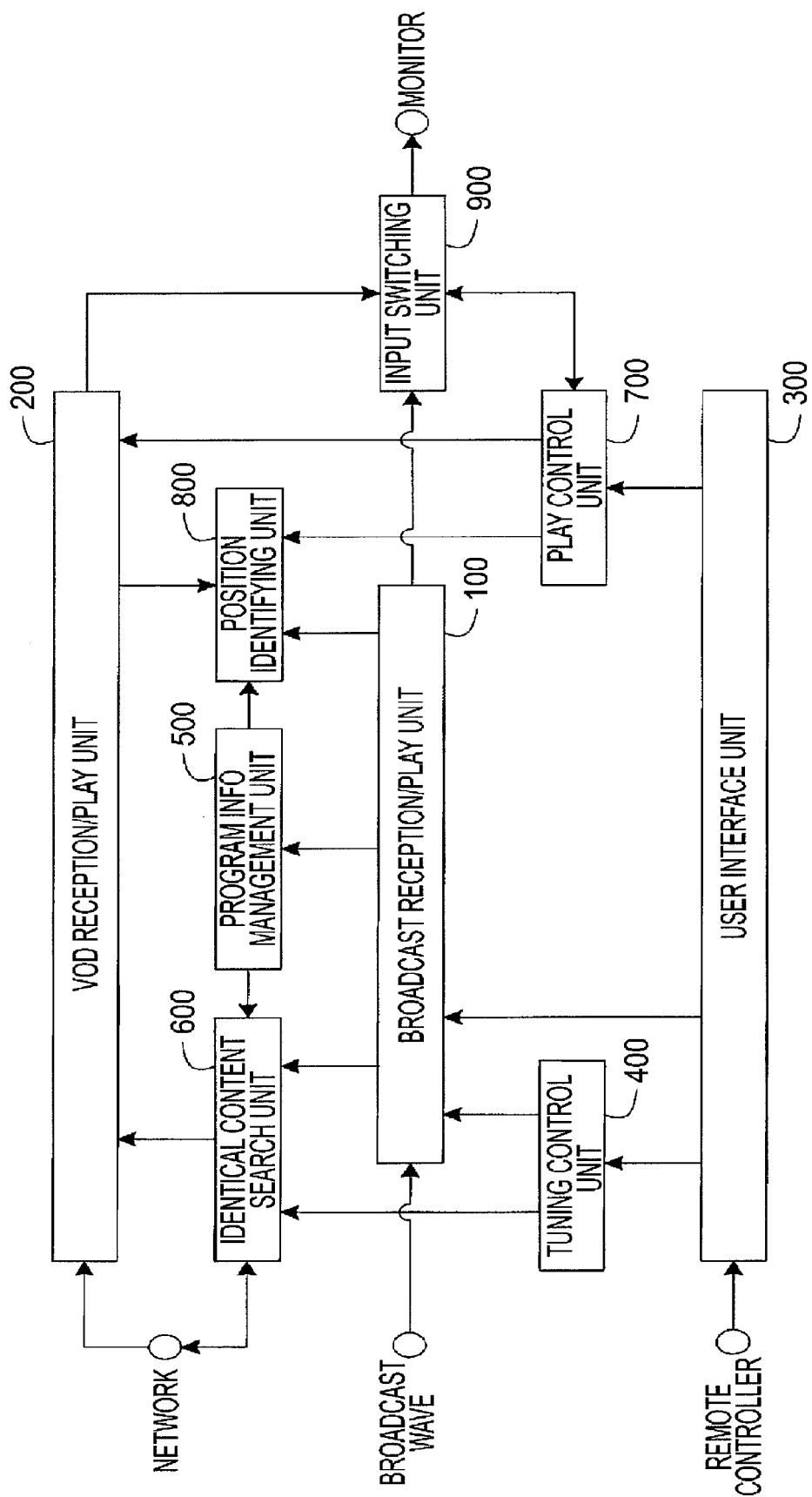
FIG. 2 is a function block diagram of the content switching apparatus according to a first embodiment.

(Explanation of FIG. 2)

FIG. 2 is a function block diagram showing the content switching apparatus 1 according to a first embodiment of the invention.

A broadcast reception/play unit 100 receives and separates the multiplexed program data from the broadcast wave into the video and audio data. The video and audio signals are decoded and output to a monitor and a speaker (not shown), respectively, through an input switching unit 900. The data is converted into the program attribute information. The program data, containing the video and audio signals constituting the program, is multiplexed in accordance with the MPEG2 (Moving Picture Experts Group 2; the second standard of the color animation coding and standardization group) transport stream (TS) scheme. The video and audio signals separated by the broadcast reception/play unit 100 are compression coded by the MPEG2 scheme, and therefore, respectively decoded by the broadcast reception/play unit 100. Also, the program attribute information includes the program broadcast channel and the program title used for the electronic program guide or the program recommendation. Also, the broadcast reception/play unit 100 manages the present time based on the current date and hour included in the program attribute information.

The VOD reception/play unit 200 receives the location-designated VOD content data from the VOD server on the network, and reproduces the content in accordance with the play command from the play control unit 700. The play command includes a play command by designation of the absolute position such as the head play or the scene play, a play command by designation of the relative positions such as the play by skipping 15 seconds ahead, and a play speed change command such as the rapid feed play or the pause. Also, the VOD reception/play unit 200 acquires the progress correspondence table indicating the temporal relation between the location-designated VOD content and the broadcast program and delivers the progress correspondence table to the position identifying unit 800. The progress correspondence table and the VOD reception/play unit 200 are described in detail later.

The user interface unit 300 receives a command from the user and controls the broadcast reception/play unit 100, the tuning control unit 400 and the play control unit 700 in such a manner as to perform the operation in accordance with the command. Examples of the user command include a tuning request (channel change) and a trick play request (skip to future or past, rapid feed, rewind, etc.). The command from the user is issued normally through the remote controller.

The tuning control unit 400 issues a command to the broadcast reception/play unit 100 in such a manner as to select the channel in accordance with the tuning request received from the user interface unit 300. The tuning request is generated by the push of a specified button on the remote controller, the tuning operation on the electronic program guide, etc. The tuning control unit 400 notifies the channel selection to the identical content search unit 600.

The program information management unit 500 holds the program attribute information of the programs being broadcast and scheduled to be broadcast. These program attribute information are periodically updated by the broadcast reception/play unit 100.

The identical content search unit 600 acquires the program information on the program being viewed, from the program information management unit 500, and makes the search as to whether the same program is existent as the VOD content in the VOD server on the network. In the presence of the same VOD content, the content location information is sent to the VOD reception/play unit 200. The identical content search unit 600 is described in more detail later.

The play control unit 700 instructs the VOD reception/play unit 200 to control the play in accordance with the trick play request from the user interface unit 300. The trick play is intended to change the play position by such an operation as "skip 15 seconds ahead", "skip 15 seconds back", "rapid feed" or "rewind". In the case where the trick play request is received while the broadcast is being viewed, the VOD position is acquired from the position identifying unit 800 and the input switching unit 900 is instructed to change to the VOD play. The play control unit 700 is described in detail later.

The position identifying unit 800 identifies the VOD position corresponding to the present position of the viewing program using the progress correspondence table. The position identifying unit 800 is described in detail later.

The input switching unit 900 switches the image input to the monitor in accordance with the switching command from the play control unit 700. The input switching unit 900 also holds the information as to whether the present switching destination is the broadcast image or the VOD image.

Figure 3:
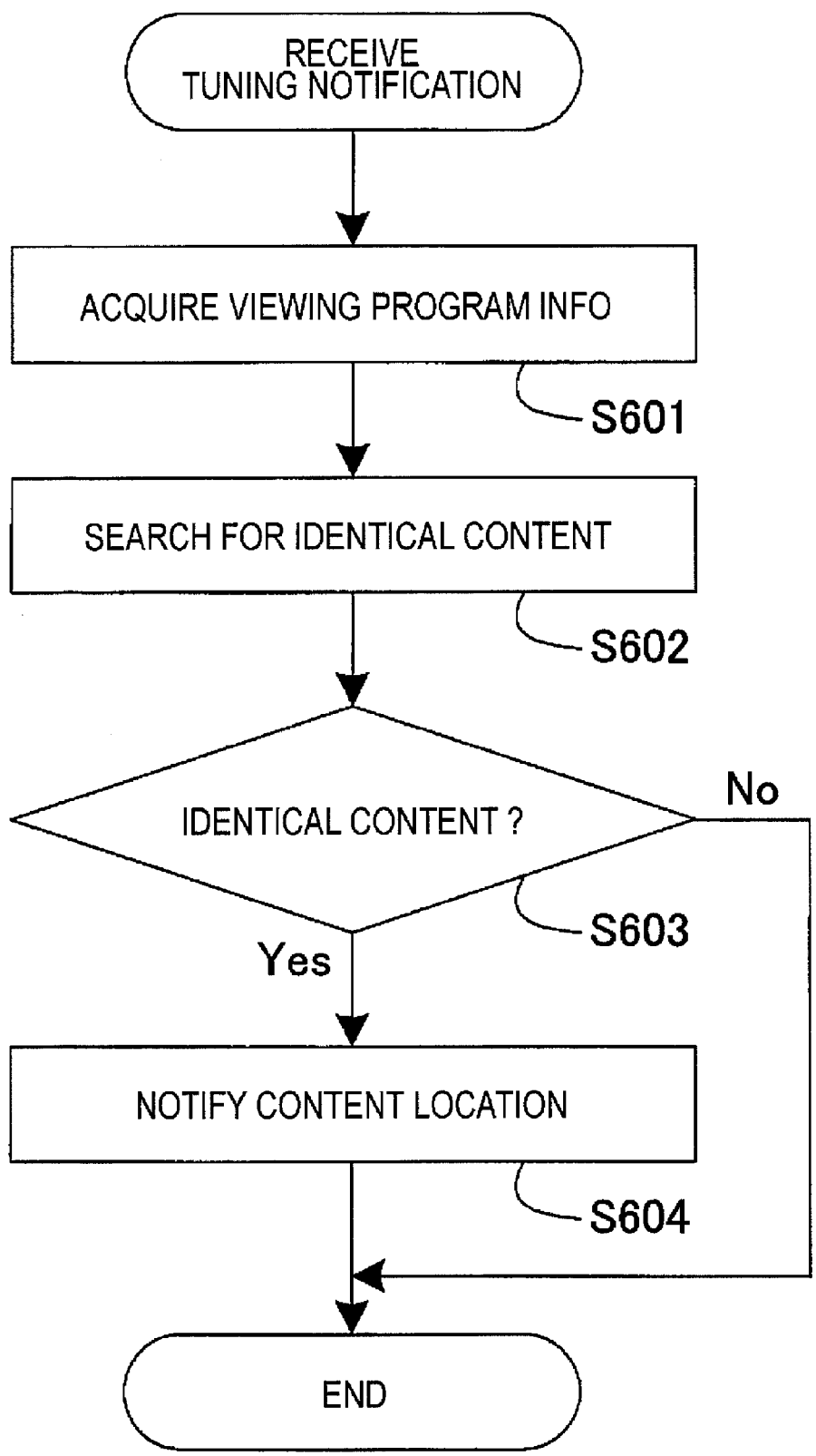
FIG. 3 is a flowchart of the process executed by an identical content search unit 600 according to the first embodiment.

(Explanation of FIG. 3)

The process before the identical content search unit 600 searches the same VOD content and issues the location notification to the VOD reception/play unit 200 is described. The flow of the process in the identical content search unit 600 is shown in FIG. 3.

The identical content search unit 600, upon reception of the tuning notification from the tuning control unit 400, acquires the program information on the viewing program from the program information management unit 500 (S601). Then, the identical content search unit 600 makes the search as to whether the content meeting the search condition in the form of the program information exists in the VOD server (S602). The program information used as the search condition is assumed to include at least the program title. In the absence of the content meeting the search condition (NO in S603), the search is ended. In the presence of the content meeting the search condition (YES in S603), on the other hand, the identical content search unit 600 notifies the location information required for receiving content to the VOD reception/play unit 200 (S604) and ends the search. The URI (uniform resource identifier) constituting an identifier assigned to the information resources on the internet is used as the location information.

Figure 4:
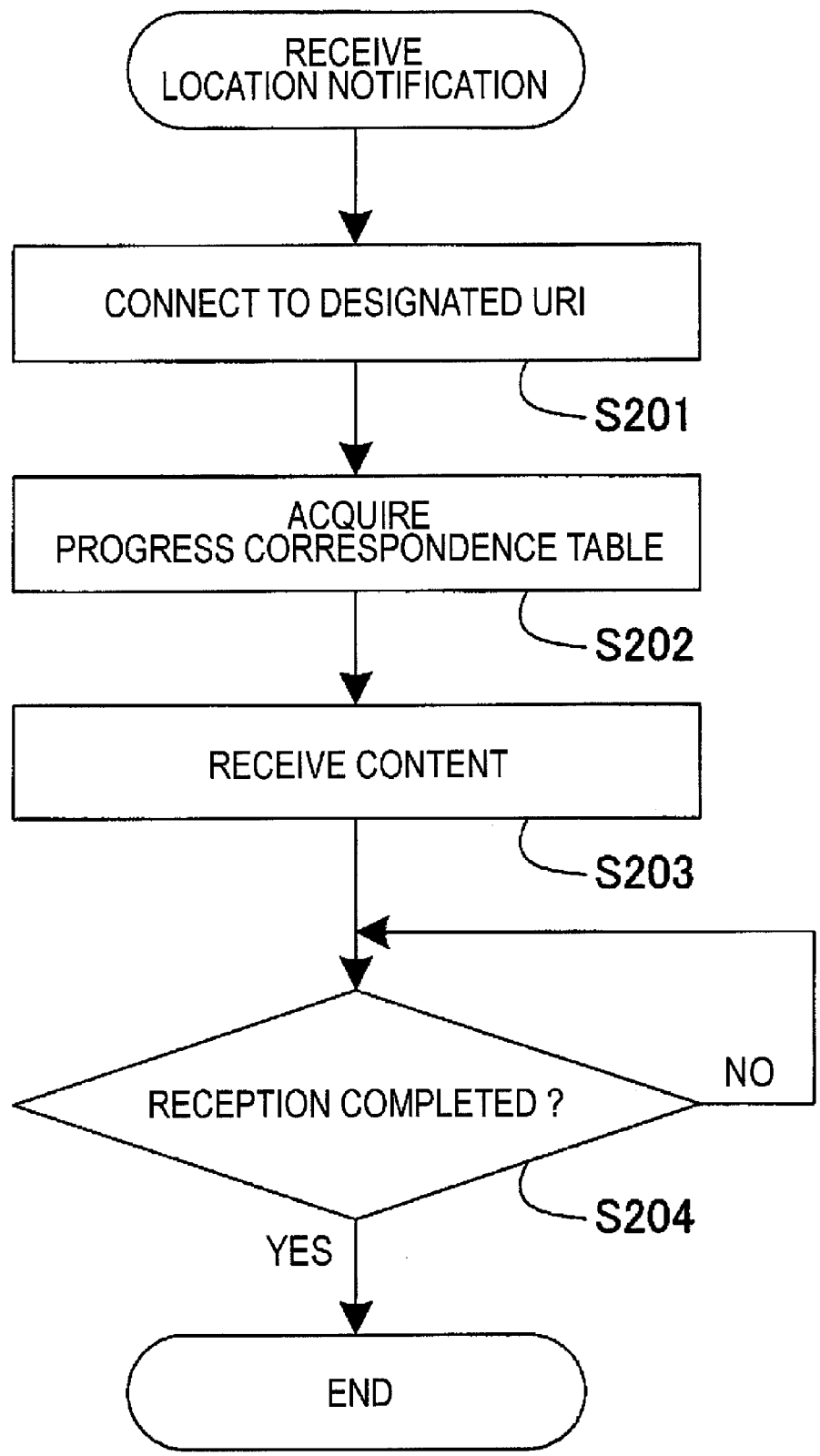
FIG. 4 is a flowchart of the process executed by a VOD reception/play unit 200 according to the first embodiment.

(Explanation of FIG. 4)

The process before the VOD reception/play unit 200 receives the same content based on the location notification is described. FIG. 4 shows the processing flow in the VOD reception/play unit 200.

The VOD reception/play unit 200, upon reception of the location notification from the identical content search unit 600, connects it as the location information to the URI (S201). Then, the VOD reception/play unit 200 acquires the progress correspondence table indicating the correspondence between the broadcast time and the VOD time (S202) and starts to receive the identical VOD content (S203). Upon completing content reception (YES in S204), the reception process is ended. The progress correspondence table thus acquired is managed by the position identifying unit 800. Also, the identical VOD content received is managed by the VOD reception/play unit 200. The reception of the identical VOD content makes possible the trick play such as the skip or the rapid feed of the viewing program by switching the broadcast program being viewed to the VOD reproduced image.

Figure 6:
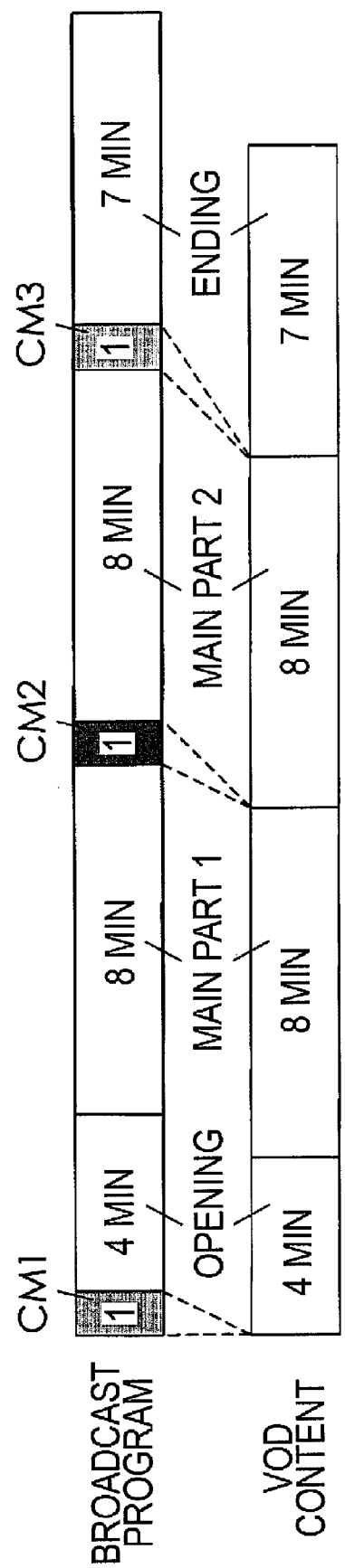
FIG. 6 shows an example of the configuration of the VOD content identical with a broadcast program according to the first embodiment.

(Explanation of FIGS. 5 and 6)

The progress correspondence table acquired by the VOD reception/play unit 200 and managed by the position identifying unit 800 is described below with reference to an example shown in FIGS. 5 and 6.

The term "progress correspondence table" is defined as the data defining the relation between the broadcast program and the identical VOD content in time segments. Also, the term "time segments" is defined as a constituent element such as an opening scene or a CM scene of the broadcast program or the VOD content.

An example of the progress correspondence table with the broadcast program and the identical VOD content having the configuration shown in FIG. 6 is shown in FIG. 5. In the example shown in FIG. 6, the broadcast program is a 30-minute program including three one-minute CM periods, and the identical VOD content is a 27-minute content including no CM. Also, the part other than the CM is configured of four scenes including the opening, the main part 1, the main part 2 and the ending part.

The progress correspondence table is assumed to include at least "the starting time of the broadcast program", "the starting time of the identical VOD content" and "the duration (the time required from start to end)" as time segments of the broadcast program and the identical VOD content. As understood from FIG. 5, there is a scene not contained in the identical VOD content for one minute from the broadcast program starting time 00:00:00 (a). Also, it is understood that the eight-minute scene from 00:05:00 of the broadcast program corresponds to the eight-minute scene starting from 00:04:00 of the identical VOD content (b).

The broadcasting station providing the program may send out the progress correspondence table in superposition on the broadcast wave so that the broadcast reception/play unit 100 may acquire the progress correspondence table. In this case, the identical content search unit 600 notifies the content location to the VOD reception/play unit 200 while at the same time instructing the broadcast reception/play unit 100 to acquire the progress correspondence table. The progress correspondence table acquired by the broadcast reception/play unit 100 is managed by the position identifying unit 800.

Figure 8:
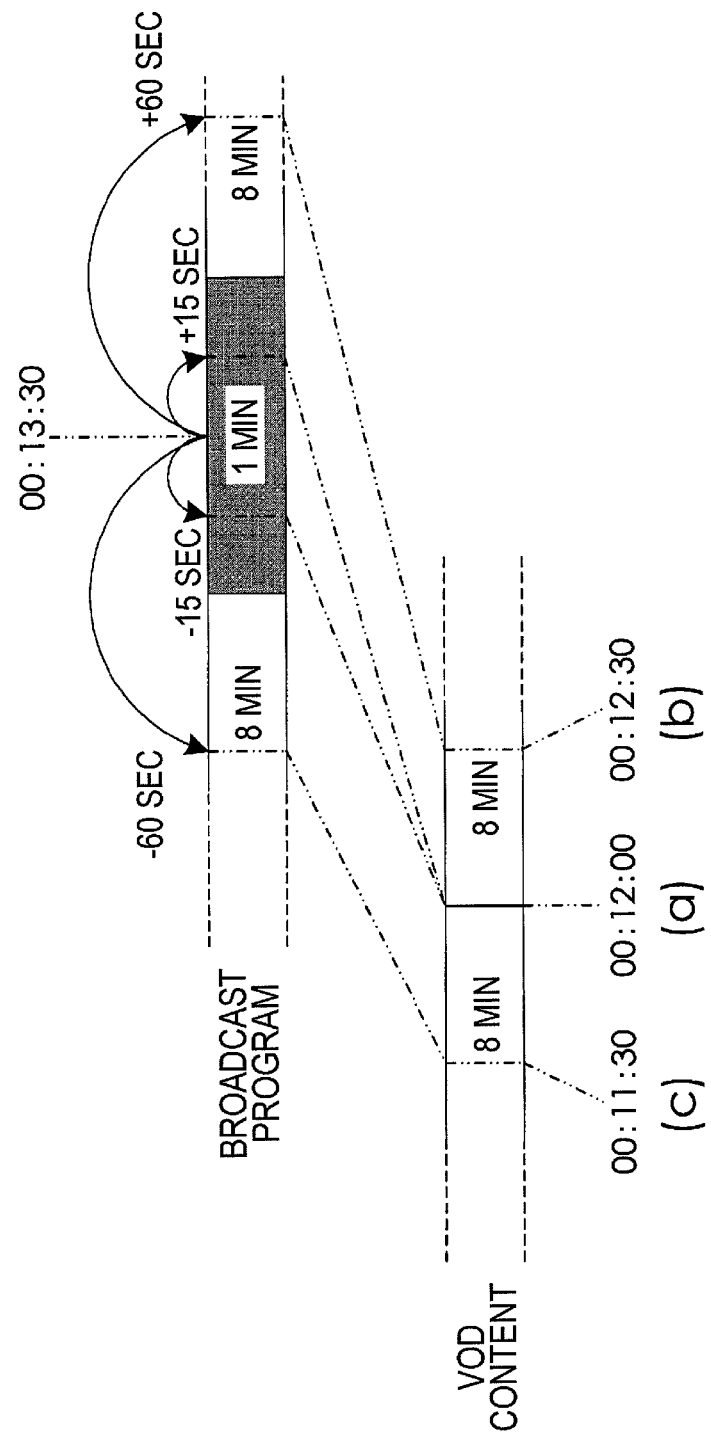
FIG. 8 shows an example of position identification according to the first embodiment.

(Explanation FIGS. 7 and 8)

The process executed by the position identifying unit 800 to identify the play position of the identical VOD content corresponding to the present position of the broadcast program being viewed is described. FIG. 7 is a flowchart of the process executed by the position identifying unit 800.

The position identifying unit 800, upon reception of a position inquiry from the play control unit 700, acquires present time from the broadcast reception/play unit 100 and the viewing program starting time from the program information management unit 500 at the same time. Then, the position identifying unit 800 calculates the elapsed broadcast time from the present time and the viewing program starting time and thus calculates the elapsed broadcast time applicable to a trick play request (S801). In the example shown in FIG. 6, assuming that the present time is 19:05:30, the broadcast starting time 19:00:00 and the trick play request "skip 15 seconds ahead". Then, the elapsed broadcast time after the trick play is calculated as 00:05:45.

The position identifying unit 800 accesses the progress correspondence table (S802) and confirms as to whether there exists the elapsed time of the identical VOD content corresponding to the elapsed broadcast time calculated (S803). In the case where there is the elapsed time of the identical VOD content corresponding to the elapsed broadcast time after the trick play (YES in step S803), the elapsed time of the particular identical VOD content is set as the play position (S807). In the case where the elapsed broadcast time after the trick play is 00:05:45, for example, the progress correspondence table of FIG. 5 shows that the identical VOD content play position is 00:04:45.

In the absence of the elapsed time of the corresponding identical VOD content (NO in S803), the position identifying unit 800 confirms as to whether the trick play request constituting the motive of the position inquiry by the play control unit 700 is the position change toward the future or the position change toward the past (S804). In the case where the position change is toward the future such as "skip 15 seconds ahead" (YES in S804), the position identifying unit 800 advances the elapsed broadcast time into the future and specifies the nearest elapsed time of the identical VOD content from the progress correspondence table (S805). In the case where the position change is into the past such as "skip 15 seconds back" (NO in S804), on the other hand, the nearest elapsed time of identical VOD content is specified from the progress correspondence table retroactively of the elapsed broadcast time (S806). The elapsed time of the identical VOD content specified in this way is set as the play position of the identical VOD content (S807). In the case where the elapsed broadcast time before the trick play is 00:13:30, for example, the position change "skip 15 seconds ahead" leads to the play position 00:12:00 ((a) in FIG. 8); the position change "skip 60 seconds ahead" to the play position 00:12:30 ((b) in FIG. 8); the position change "skip 15 seconds back" to the play position 00:12:00 ((a) in FIG. 8); and the position change "skip 60 seconds back" to the play position 00:11:30 ((c) in FIG. 8).

Figure 9:
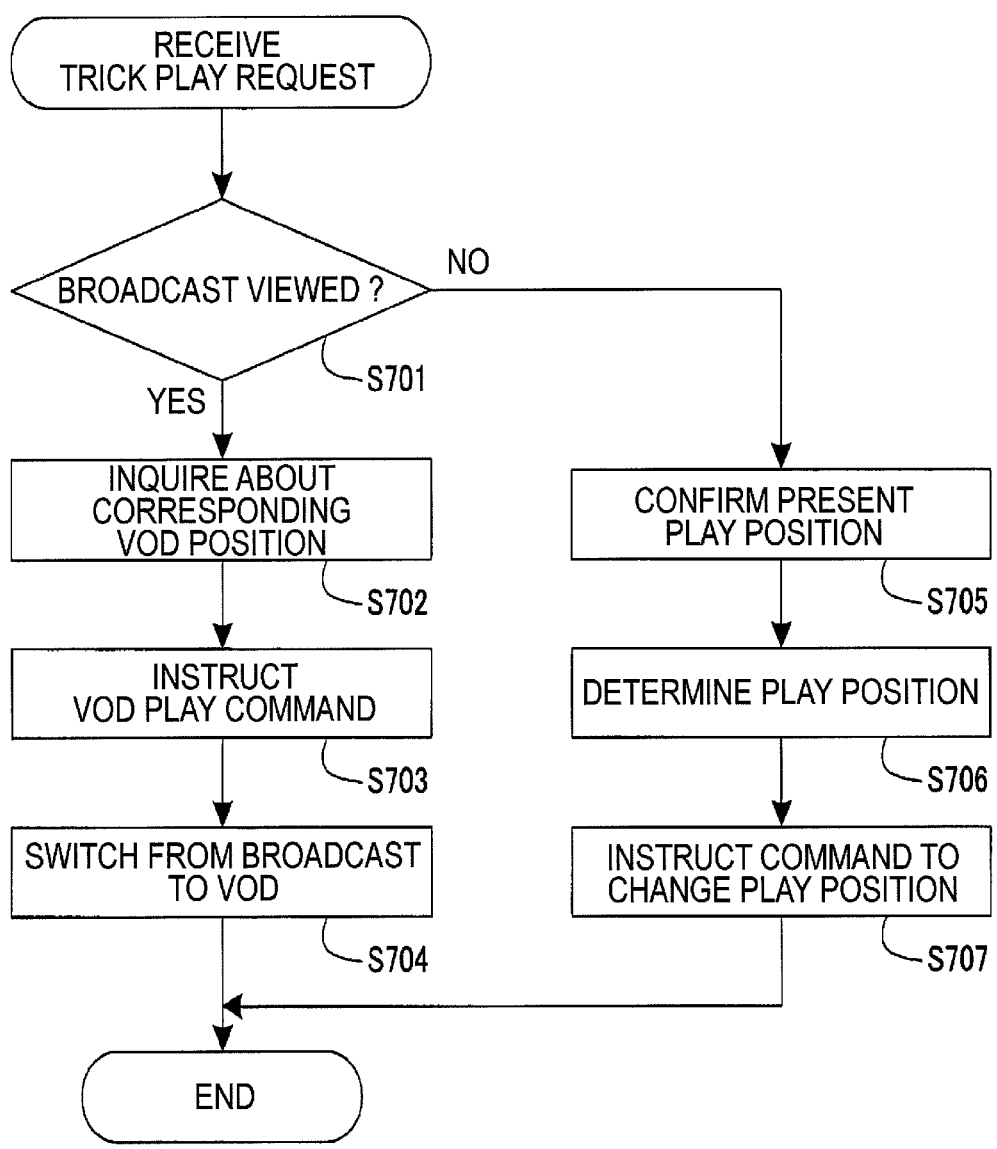
FIG. 9 is a flowchart of the process executed by a play control unit 700 according to the first embodiment.

(Explanation of FIG. 9) The process executed by the play control unit 700 to start to play the identical VOD content or change the play position in response to the user operation is described. FIG. 9 shows the flowchart of the process executed by the play control unit 700.

The play control unit 700, upon reception of the trick play request from the user interface unit 300, makes inquiry to the input switching unit 900 as to whether the broadcast program or the VOD program is being viewed (S701). In the case where the broadcast program is not being viewed (NO in S701), the play control unit 700 confirms the present play position (S705) and determines the play position in accordance with the trick play request (S706). Then, the play control unit 700 instructs the VOD reception/play unit 200 to change the play position to the determined one (S707) and ends the play control process.

In the case where the broadcast program is being viewed (YES in S701), on the other hand, the play control unit 700 makes an inquiry to the position identifying unit 800 about the play position of the identical VOD content corresponding to the present position of the broadcast program (S702). Then, the play control unit 700 instructs the VOD reception/play unit 200 to reproduce the identical VOD content from the VOD play position notified from the position identifying unit 800 (S703). Then, the play control unit 700 instructs the input switching unit 900 to switch the monitor output from the broadcast image to the VOD image (S704). In the case of FIG. 5, assuming that the present time is 19:05:30, the broadcast start time 19:00:00 and the user requests the trick play "skip 15 seconds ahead", then the image is switched to the identical VOD content reproduced from 00:04:45.

(Explanation of Effects of First Embodiment)

Even in the case where the time length or the content configuration are varied between the broadcast program and the VOD content due to the edition difference or the absence or presence of the CM, the use of the progress correspondence table makes it possible to identify the internal position of the VOD content corresponding to the skip destination designated by the user in the broadcast program. Also, even in the absence of a corresponding scene in the VOD content, the nearest scene is selected as the play position. As a result, the undesirable situation is difficult to develop in which skipping 15 seconds ahead during the CM in the broadcast program causes to play the identical VOD content from two minutes ahead. In switching from the real-time broadcast to the VCD content, therefore, the VOD content starts to be played from the position expected by the user as far as possible.

<Second Embodiment>

According to the first embodiment, the configuration is described to identify the position using the progress correspondence table acquired from the VOD server holding the identical VOD content. The second embodiment, on the other hand, concerns a configuration in which the position is identified using the VOD offset information contained in the program attribute information acquired from the broadcast wave. In the description that follows, a similar configuration and a similar process to those of the first embodiment are not described, and the explanation is concentrated on the configuration unique to the second embodiment.

Figure 10:
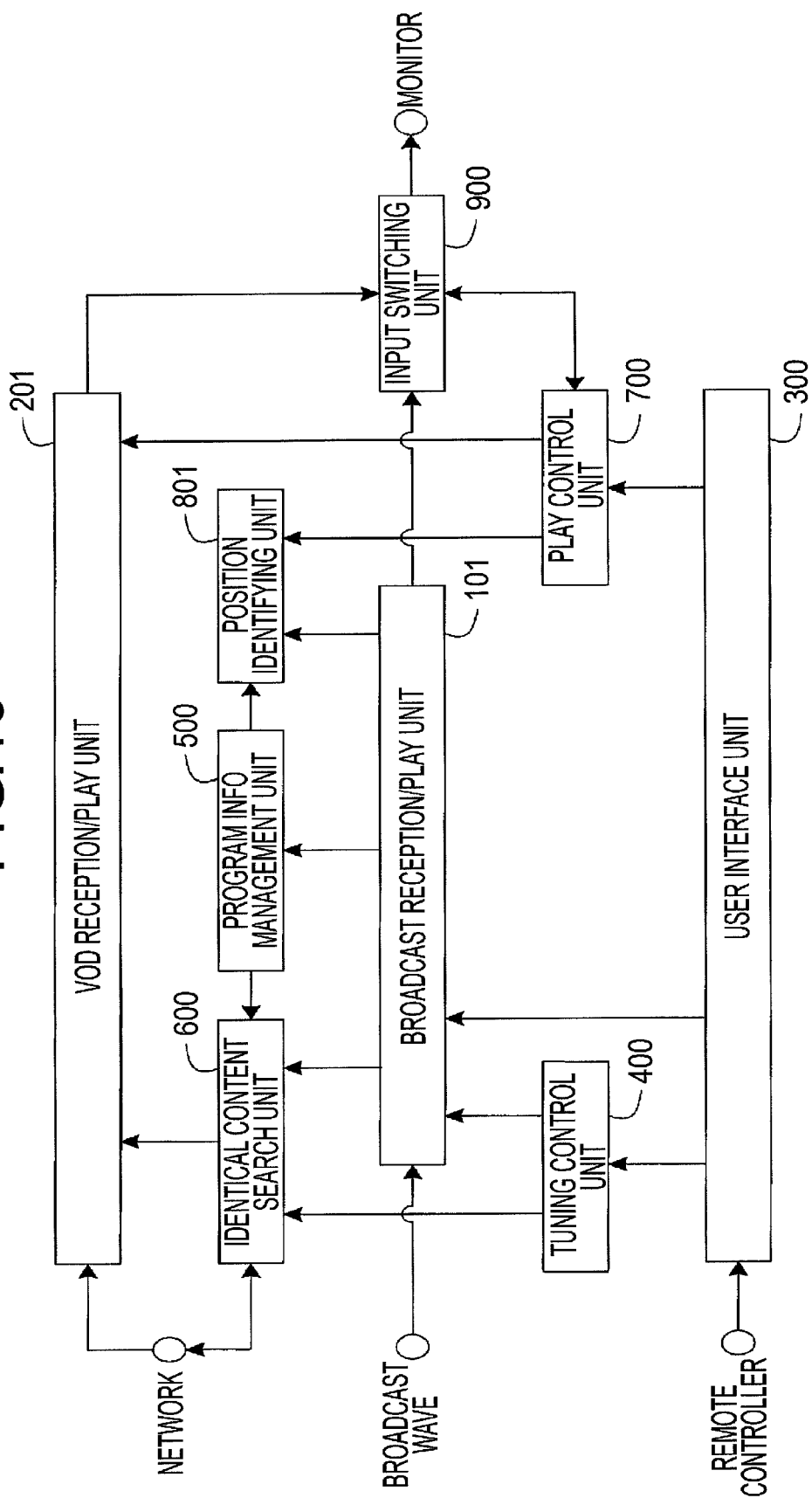
FIG. 10 is a function block diagram showing the content switching apparatus according to a second embodiment.

(Explanation of FIG. 10)

FIG. 10 is a function block diagram showing the content switching apparatus according to a second embodiment of the invention.

The broadcast reception/play unit 101 receives the multiplexed program data from the broadcast wave and demultiplexes them into the video and audio data. The video and audio signals are decoded and output to a monitor and a speaker (not shown) through the input switching unit 900. The resulting data are converted into the program attribute information. Also, the broadcast reception/play unit 101 manages the present time based on the present hour and the present date contained in the program attribute information. Also, the broadcast reception/play unit 101 acquires the VOD offset information indicating the temporal relation between the identical VOD content and the broadcast program and delivers it to the position identifying unit 801.

The VOD reception/play unit 201 receives the location-designated VOD content data from the VOD server on the network, and reproduces the content in accordance with the play command from the play control unit 700. The VOD reception/play unit 201 is described in more detail later.

The position identifying unit 801 identifies the VOD position corresponding to the present position of the broadcast program using the VOD offset information. The VOD offset information and the position identifying unit are described in more detail later.

Figure 11:
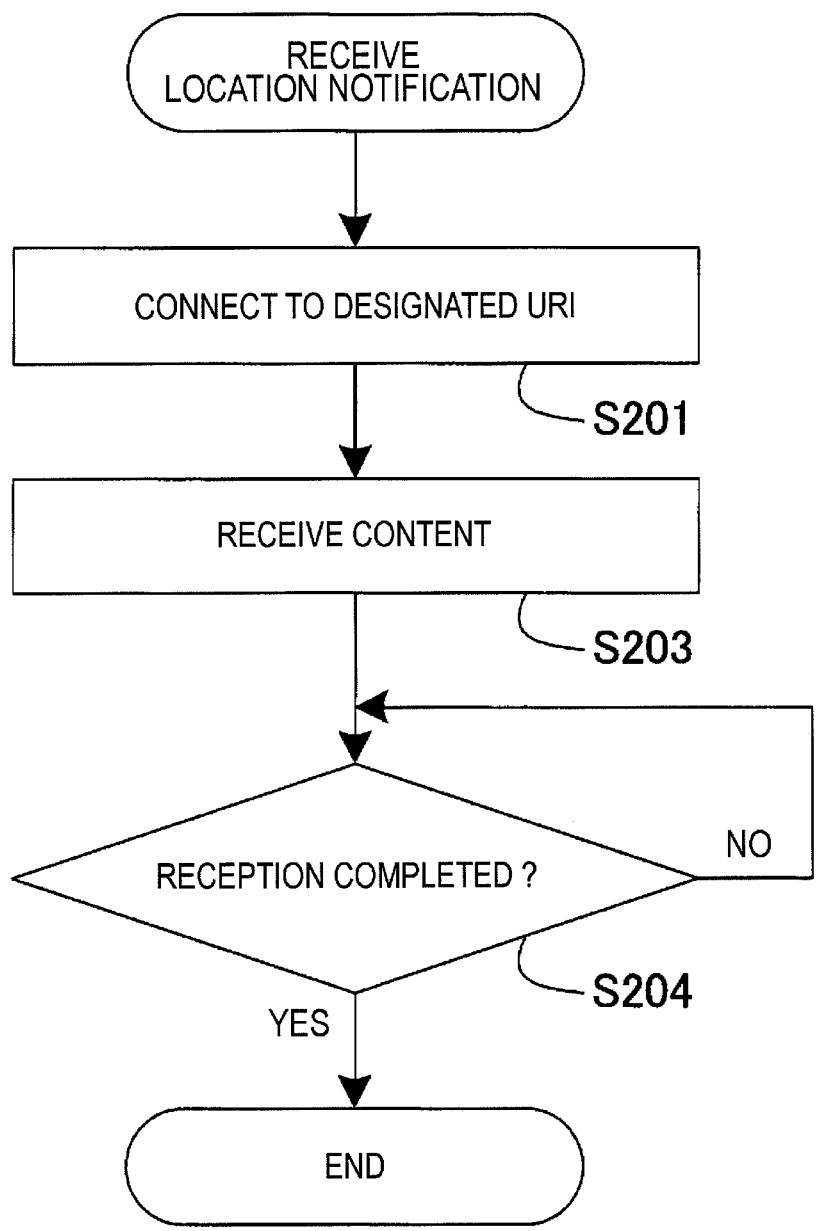
FIG. 11 is a flowchart of the process executed by a VOD reception/play unit 201 according to the second embodiment.

(Explanation of FIG. 11)

The process executed by the VOD reception/play unit before receiving the identical content based on the location notification is described. FIG. 11 is a flowchart showing the process executed by the VOD reception/play unit 201.

The VOD reception/play unit 201, upon reception of the location notification from the identical content search unit 600, is connected to the URI indicated as the location information (S201), and starts to receive the identical VOD content (S203). Upon completing reception of the content (YES in S204), the VOD reception/play unit 201 ends the reception process. The identical VOD content thus received is managed by the VOD reception/play unit 201.

(Explanation FIG. 12)

The VOD offset information acquired by the broadcast reception/play unit 101 in response to the acquisition request from the position identifying unit 801 is described with reference to the example shown in FIGS. 12 and 6. The VOD offset information is defined as the progress difference between the broadcast program and the identical VOD content expressed in terms of time and polarity (ahead or behind). An example of the VOD offset information with the broadcast program and the identical VOD content having the relation of FIG. 6 is shown in FIG. 12. It is understood from FIG. 12 that the progress difference for the present time of 19:02:00 is the VOD one minute ahead (a). Also, the progress difference for the present time 19:23:00 is the VOD three minutes ahead (b).

Figure 13:
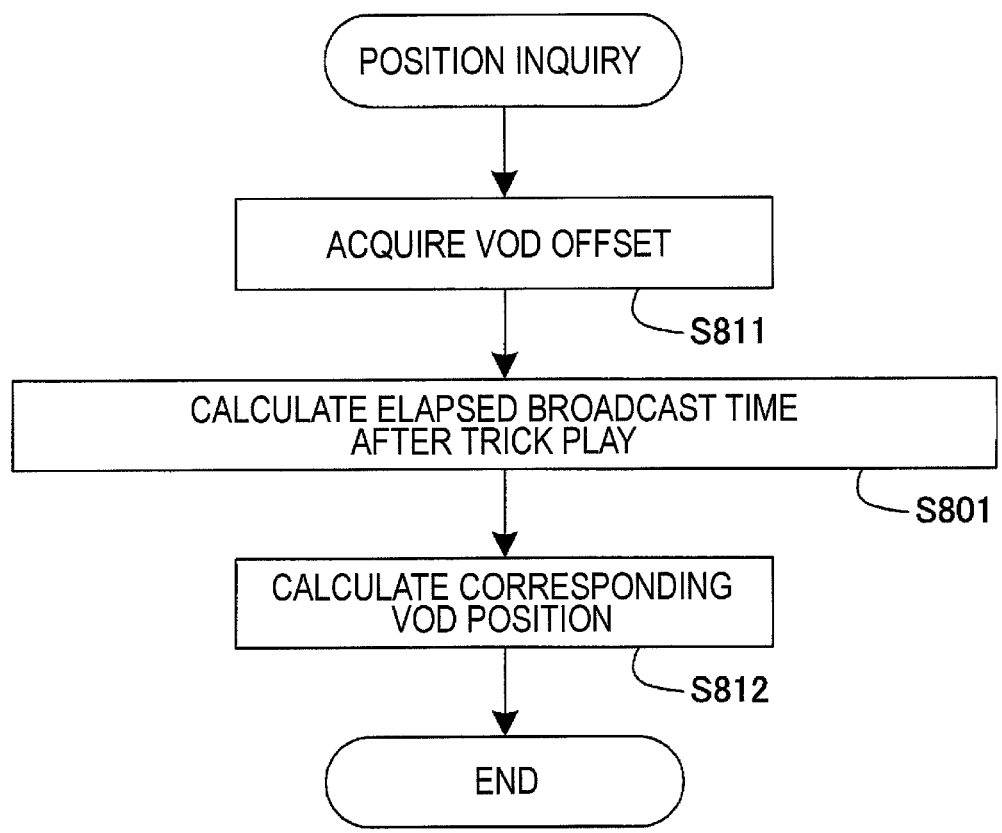
FIG. 13 is a flowchart of the process executed by a position identifying unit 801 according to the second embodiment.

(Explanation of FIG. 13)

The process executed by the position identifying unit 801 to identify the play position of the identical VOD content corresponding to the present position of the broadcast program being viewed is described. FIG. 13 is a flowchart showing the process executed by the position identifying unit 801.

The position identifying unit 801, upon reception of a position inquiry from the play control unit 700, acquires the VOD offset information from the broadcast reception/play unit 101 (S811). The elapsed broadcast time applicable to a trick play request is calculated (S801) in the same way as in the first embodiment, and therefore, will not be repeated. Then, the position identifying unit 801 calculates the VOD content play position from the VOD offset information and the elapsed broadcast time after the trick play (S812). In the case of FIG. 12, upon generation of the trick play request "skip 15 seconds ahead" at 19:02:00, the corresponding play position of the identical VOD content is determined as 00:01:15 from the fact that the VOD is one minute ahead and the elapsed broadcast time after the trick play is 00:02:15.

(Explanation of Effects of Second Embodiment)

Even in the case where the broadcast program and the VOD content are different in time length or content configuration due to the absence or presence of a CM or the edition difference, the use of the VOD offset information makes it possible to identify the position of the identical VOD content corresponding to a specified position of the broadcast program like in the first embodiment. As a result, the undesirable situation rarely occurs in which skipping 15 seconds ahead during the CM of the broadcast program, for example, causes to play the identical VOD content from two minutes ahead. In switching from the real-time broadcast to the VOD content, therefore, the VOD content starts to be played from the position expected by the user as far as possible.

<Third Embodiment>

According to the first embodiment, the configuration is described in which the position is identified using the progress correspondence table acquired from the VOD server holding the identical VOD content. According to the third embodiment, on the other hand, the configuration is described in which the position is identified using the segment meta data acquired from the VOD server and the broadcast wave. In the description that follows, the configuration and the process similar to those of the first embodiment are not described, and the explanation is concentrated on the configuration unique to the third embodiment.

Figure 14:
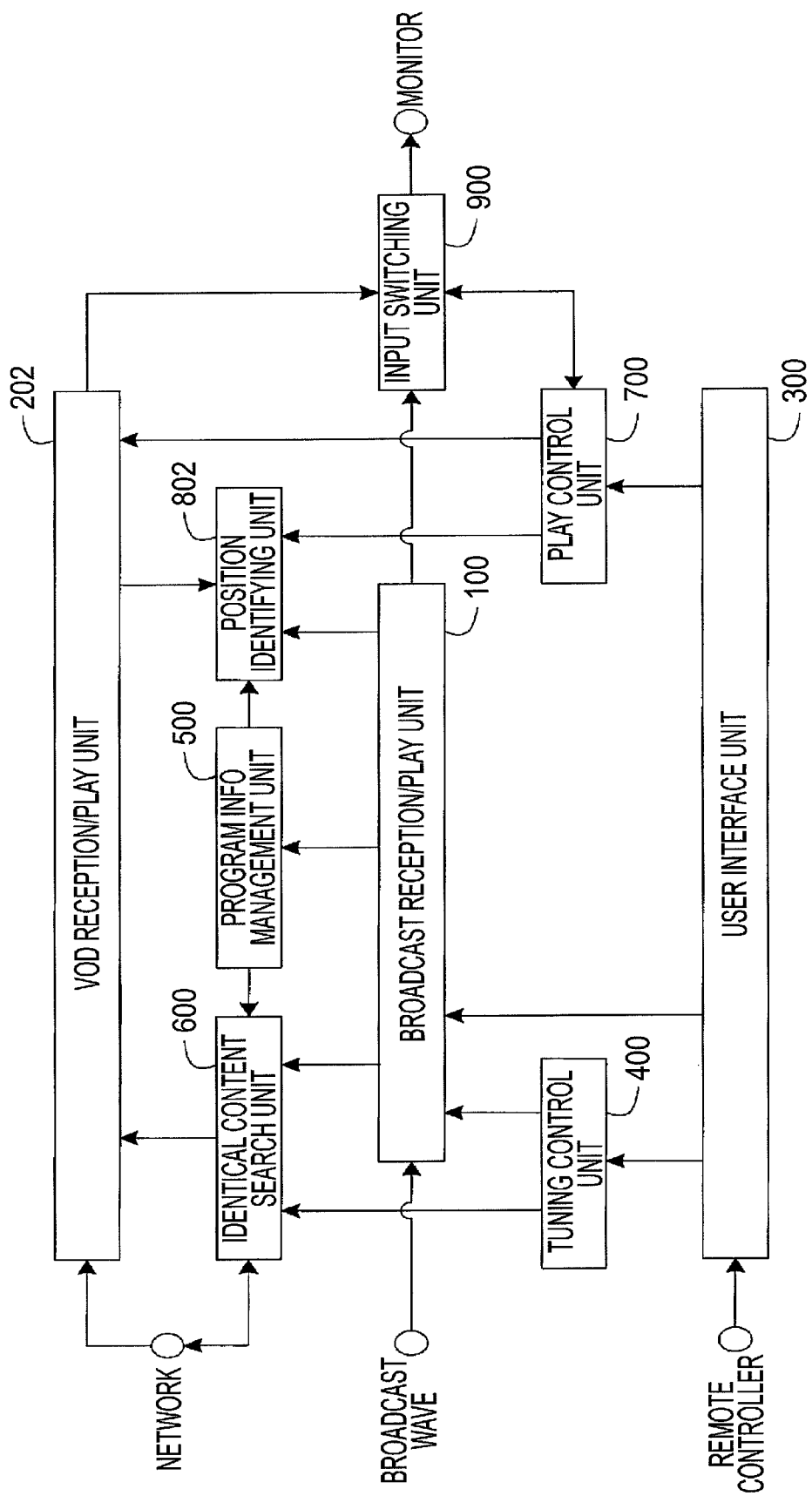
FIG. 14 is a function block diagram showing the content switching apparatus according to a third embodiment.

(Explanation of FIG. 14)

FIG. 14 is a function block diagram of the content switching apparatus according to the third embodiment of the invention.

The VOD reception/play unit 202 receives the location-designated VOD content data from the VOD server on the network, and reproduces the content in accordance with the play command from the play control unit 700. Also, the VOD reception/play unit 202 acquires the segment meta data of the location-designated VOD content and delivers it to the position identifying unit 802. The segment meta data and the VOD reception/play unit 202 are described in detail later.

The position identifying unit 802 identifies the VOD position corresponding to the present position of the viewing program using the segment meta data of both the broadcast program and the VOD content. The position identifying unit 802 is described in detail later.

Figure 15:
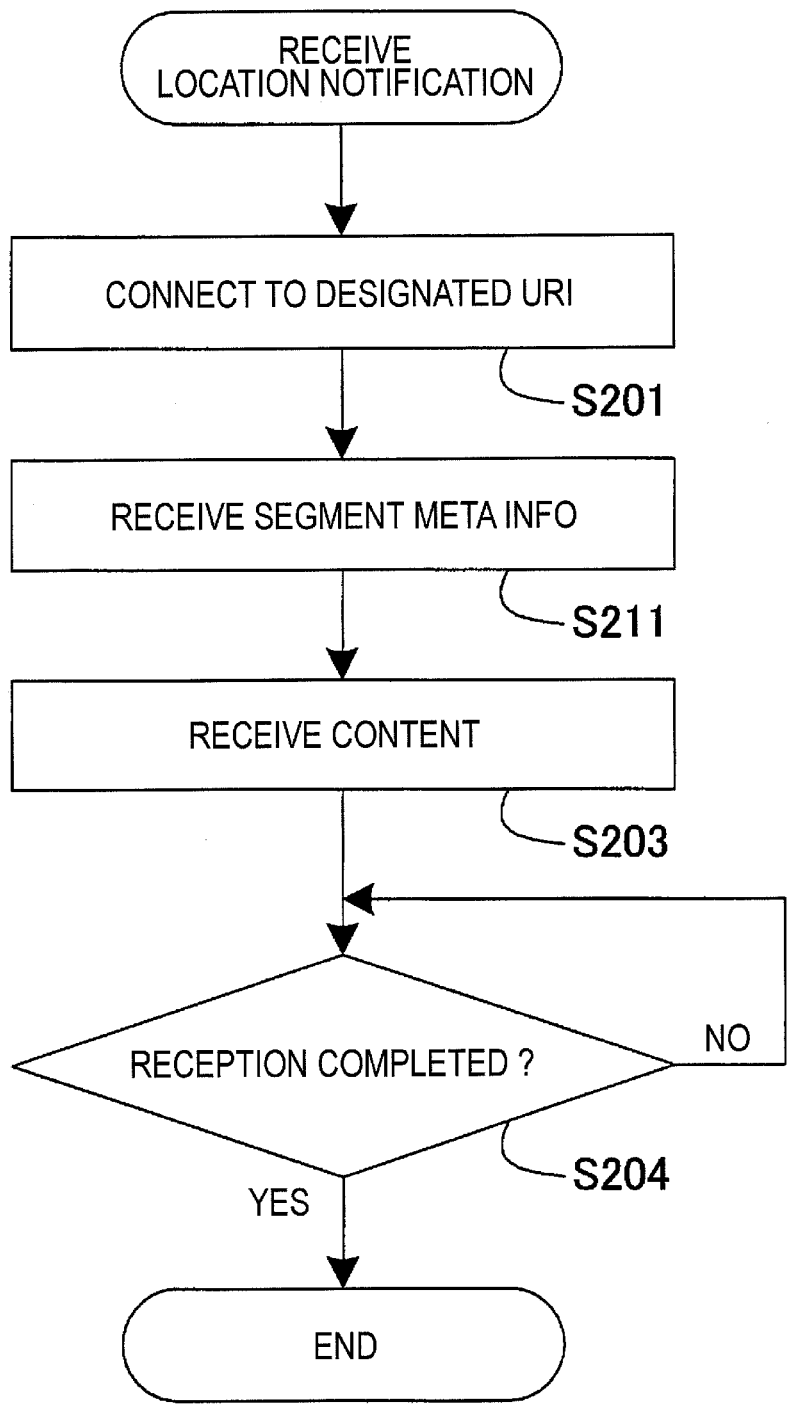
FIG. 15 is a flowchart of the process executed by a VOD reception/play unit 202 according to the third embodiment.

(Explanation of FIG. 15)

The process executed by the VOD reception/play unit 202 before receiving the identical content based on the location notification is described. FIG. 15 is a flowchart showing the process executed by the VOD reception/play unit 202.

The VOD reception/play unit 202, upon reception of the location notification from the identical content search unit 600, is connected to the URI indicated as the location information (S201). Then, the VOD reception/play unit 202 acquires the segment meta data (S211) and starts to receive the identical VOD content (S203). Upon completing content reception (YES in S204), the VOD reception/play unit 202 ends the receiving process. The identical VOD content received is managed by the VOD reception/play unit 202.

(Explanation of FIGS. 16 and 17)

The segment meta data managed by the position identifying unit 802 is described with reference to the case shown in FIGS. 16 and 17. The segment meta data is the definition information on the time segment of the broadcast program and the identical VOD content. An example of the segment meta data with the broadcast program and the identical VOD content configured as shown in FIG. 6 is shown in FIGS. 16 and 17. FIG. 16 shows an example of the segment information on the identical VOD content acquired by the VOD reception/play unit 202, and FIG. 17 is an example of the segment information on the broadcast program acquired by the broadcast reception/play unit 100. The segment meta data is assumed to include at least the "title", "starting time" and "duration" (time required from start to end) of each segment. By referring to the title, the correspondence between the segment of the broadcast program and the segment of the VOD content is determined.

From the segment information shown in FIG. 16(a), it is understood that the opening of the identical VOD content begins from 00 second (see MediaRelIncrTimePoint tag) and lasts for 240 seconds (see MediaIncrDuration tag). Also, it is understood from the segment information shown in FIG. 17(b) that the opening scene of the broadcast program starts from 60 seconds.

(Explanation of FIG. 18)

The process executed by the position identifying unit 802 to identify the play position of the identical VOD content corresponding to the present position of the broadcast program being viewed is described. FIG. 18 is a flowchart of the process executed by the position identifying unit 802.

The position identifying unit 802, upon reception of a position inquiry from the play control unit 700, acquires the segment meta data of the broadcast program from the broadcast reception/play unit 100 (S821) and acquires the segment meta data of the identical VOD content from the VOD reception/play unit 202 (S822). The calculation of the elapsed broadcast time for the trick play request (S801) is similar to that of the first embodiment and will not be repeated.

Next, the position identifying unit 802 specifies the broadcast program segment associated with the elapsed broadcast time after the trick play (S823). In the case of FIG. 17, assuming that the trick play "skip 15 seconds ahead" occurs at 19:02:00, the elapsed broadcast time after the trick play is 00:02:15. From the duration of each segment, the segment associated with 00:02:15 is specified as an opening scene (the duration from 00:01:00 to 00:05:59).

Once the broadcast program segment is specified, the position identifying unit 802 calculates the elapsed time in this segment (S824). In the case of FIG. 17 in which the elapsed broadcast time after the trick play is 00:02:15, the elapsed broadcast time within the opening scene is 00:01:15.

Next, the position identifying unit 802 confirms as to whether the VOD segment corresponding to the specified broadcast program segment is included in the identical VOD content or not (S825). In the presence of the corresponding VOD segment (YES in S825), the elapsed time in the segment is determined as the VOD play position (S828). In the case of FIG. 17 where the specified broadcast program segment is an opening scene and the elapsed broadcast time in the segment is 00:01:15, the VOD play position is determined as 00:01:15 in the opening scene.

In the absence of the VOD segment corresponding to the broadcast program segment (NO in S825), on the other hand, the next broadcast program segment is regarded to have been specified (S826). Then, the elapsed time in the segment is determined as the head (00:00:00) (S827) thereby to confirm as to whether the VOD segment corresponding to the newly specified broadcast program segment is included in the identical VOD content or not (S825). In the case of FIG. 17, assuming that the specified broadcast program segment is one CM scene, it is not included in the identical VOD content, and therefore, the opening scene constituting the next segment is specified as a new broadcast program segment.

(Explanation of Effects of Third Embodiment)

Even in the case where the time length or the content configuration is different between the broadcast program and the VOD content due to the presence or absence of a CM or the edition difference, the use of the segment meta data makes it possible to identify the position of the identical VOD content corresponding to the specified position of the broadcast program as in the first embodiment. As a result, the undesirable situation rarely occurs in which skipping 15 seconds ahead during the CM of the broadcast program causes to play the identical VOD content from two minutes ahead. In switching from the real-time broadcast to the VOD content, therefore, the VOD content starts to be played from the position expected by the user as far as possible.

<Fourth Embodiment>

The first embodiment represents a configuration in which the position is identified using the progress correspondence table acquired from the VOD server holding the identical VOD content. The fourth embodiment, on the other hand, employs a configuration in which the position is identified by image matching between the captured image of the broadcast program and the identical VOD content. In the fourth embodiment, similar parts of the configuration and similar processes to those of the first embodiment are not described, and the explanation is concentrated on the parts of the configuration unique to the fourth embodiment.

Figure 19:
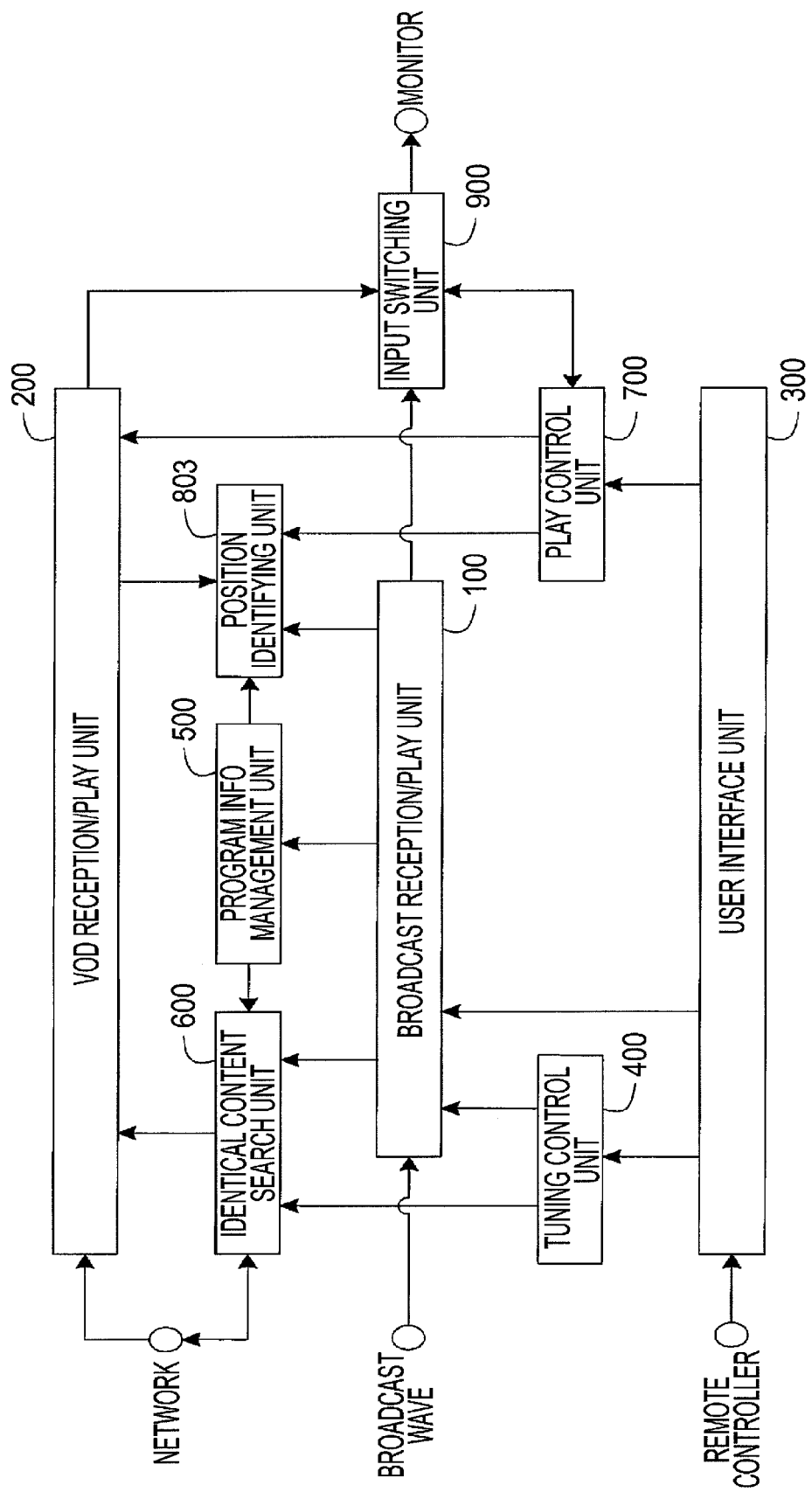
FIG. 19 is a function block diagram showing the content switching apparatus according to a fourth embodiment.

(Explanation of FIG. 19)

FIG. 19 is a function block diagram showing the content switching apparatus according to the fourth embodiment of the invention.

The position identifying unit 803 identifies the VOD position corresponding to the present position of the viewing program using the captured images of both the broadcast program and the VOD content. The position identifying unit 803 is described in detail later.

Figure 20:
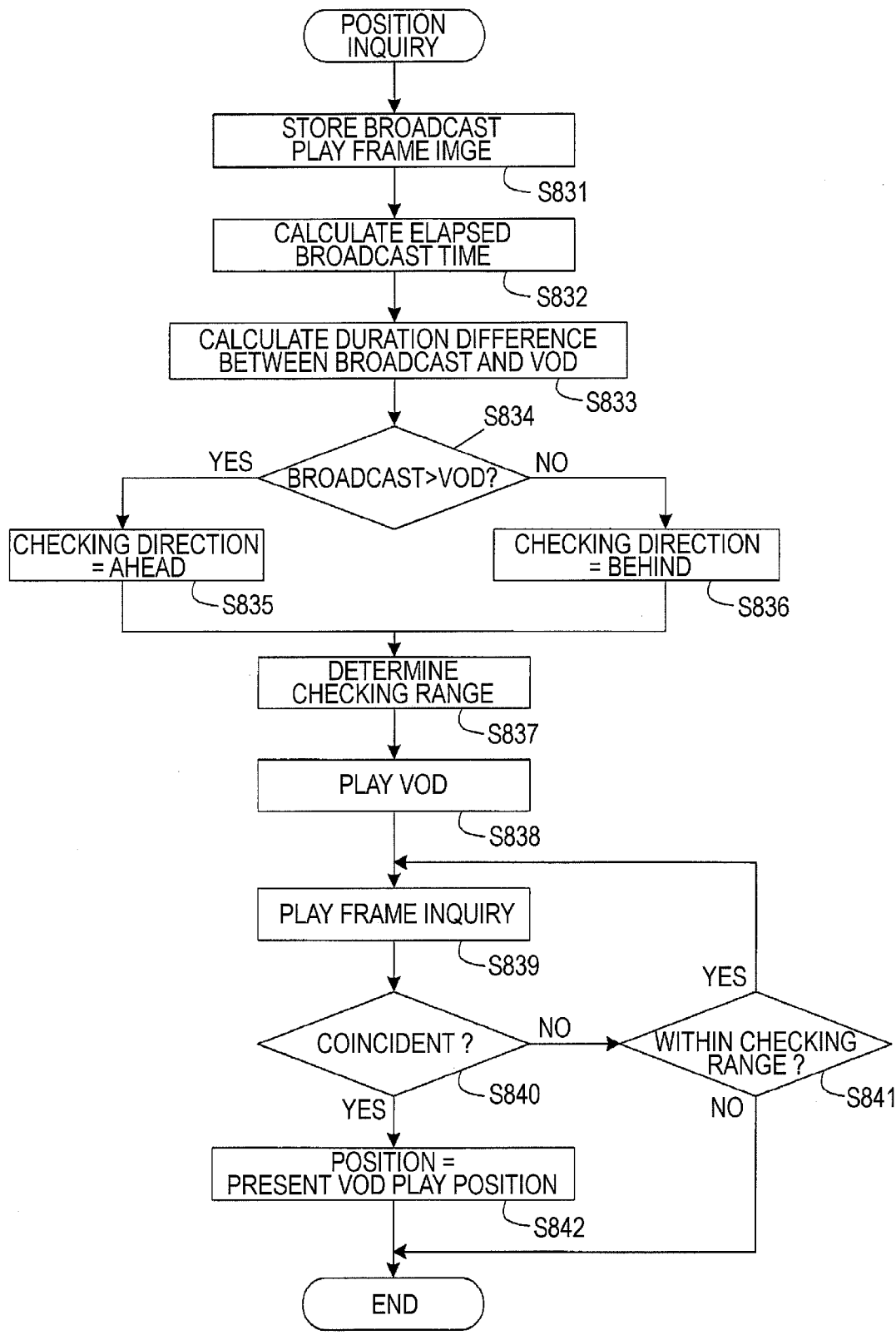
FIG. 20 is a flowchart of the process executed by a position identifying unit 803 according to the fourth embodiment.

(Explanation of FIG. 20)

The process executed by the position identifying unit 803 to identify the play position of the identical VOD convent corresponding to the present position of the broadcast program being viewed is described. FIG. 20 is a flowchart showing the process executed by the position identifying unit 803.

In the position identifying unit 803, upon reception of a position inquiry from the play control unit 700, the frame image being reproduced in the broadcast reception/play unit 100 is stored as an image to be checked (S831). Then, the position identifying unit 803 calculates the elapsed broadcast time from the present time acquired from the broadcast reception/play unit 100 and the program starting time acquired from the program information management unit 500 (S832). After that, the position identifying unit 803 calculates the difference between the broadcast program duration acquired from the program information management unit 500 and the duration of the identical VOD content acquired from the VOD reception/play unit 201 (S833).

The position identifying unit 803 confirms as to which has a longer duration, the broadcast program and the identical VOD content (S834). In the case where the broadcast program is longer (YES in S834), the direction of checking is determined ahead (S835), while if the identical VOD content is longer (NO in S834), on the other hand, the checking direction is determined behind (S836).

Then, the position identifying unit 803 determines the checking range based on the elapsed broadcast time, the duration difference and the checking direction (S837). In the case shown in FIG. 6, the duration of the broadcast program is 00:30:00, and the duration of the identical VOD content is 00:27:00. Thus, the duration difference is 00:03:00 and the checking direction is ahead. Further, assuming that the elapsed broadcast time is 00:05:00, the checking range is 00:03:00 ahead of 00:05:00, i.e. from 00:02:00 to 00:05:00.

The position identifying unit 803 reproduces the identical VOD content for the checking range thus determined (S838), and collates the frame image being reproduced with the image to be checked (S839). In the case where the frame image being reproduced is coincident with the image to be checked (YES in S840), the present play position is determined as the play position of the identical VOD content (S842). In the case where the frame image being reproduced is not coincident with the image to be checked (NO in S840), on the other hand, it is confirmed whether the next play position is included in the checking range or not (S841). In the case where the next play position is included in the checking range (YES in S841), the next frame image to be played is collated with the image to be checked (S839). In the case where the next play position is not within the checking range (NO in S841), on the other hand, the program play frame image constituting the image to be checked is not included in the identical VOD content, and the identification process is ended.

(First Modification)

The broadcast reception/play unit 100 may include a provisional memory and a CM detector so that the frame image being reproduced, if not an image in the CM, is stored in the provisional memory, and the frame image stored in the provisional memory can be used as an image to be checked in the position identification process. Even in the case where a request to skip 15 seconds ahead occurs during the CM, for example, the undesirable chance that the image to be checked may not be included in the identical VOD content is reduced in view of the fact that the frame image immediately before the CM is handled as an image to be checked.

(Second Modification)

The checking range can also be determined by measuring the elapsed CM time when detecting the CM in the broadcast reception/play unit 100 and using the elapsed CM time in addition to the elapsed broadcast time, the duration difference and the checking direction. In the case where the elapsed broadcast time 00:05:00, the duration difference is 00:03:00 and in the case where the checking direction ahead, for example, the checking range is determined as 00:02:00 to 00:05:00. In the case where the elapsed CM time is 00:00:30, however, the checking range is reduced to 00:02:30 to 00:05:00.

(Explanation of Effects of Fourth Embodiment)

Even in the case where the broadcast program and the VOD content are different in time length or content configuration due to the absence or presence of CM or edition difference, the image matching makes it possible to identify the position of the identical VOD content corresponding to the specified position of the broadcast program like in the first embodiment. As a result, the undesirable situation rarely occurs in which skipping 15 seconds ahead during the CM of the broadcast program causes to play the identical VOD content two minutes ahead. In switching from the real-time broadcast to the VOD content, therefore, the VOD content starts to be played from the position expected by the user as far as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-77406 filed on Mar. 25, 2008, which is hereby incorporated by reference herein in their entirety.

What is claimed is:

1. A content switching apparatus for switching an image of a first content being broadcasted into an image of a second content recorded and including substantially the same image as the first content, comprising:

a broadcast receiving unit which receives the image of the first content broadcasted through a broadcast signal;

a storing unit which stores the image of the second content, a length of time of the second content being different than a length of time of the first content or a content configuration of the second content being different than a content configuration of the first content;

a request receiving unit which receives a change request from a user to change a play position or a play speed during output of the first content;

a position identifying unit which identifies a position of an image in the second content, the image being substantially the same as a first image of the first content; and a play control unit which determines a play starting position to start to play the second content based on the position identified by the position identifying unit, wherein when the request receiving unit receives the change request during the output of the first content, the play control unit switches the image of the first content to the image of the second content, wherein the position identifying unit identifies the position by referring to definition information defining temporal relative positions between the images of the first content and the images of the second content, wherein the first content and the second content each includes a plurality of segments, and wherein the definition information defines correspondence of a starting time of each segment between the first and second contents.

2. A content switching apparatus according to claim 1, wherein in accordance with the first content is selected for viewing, the storing unit receives the image of the second content from a server through a network, and stores the image of the second content.

3. A content switching apparatus according to claim 1, wherein in the case where the second content has no image substantially the same as the first image, the position identifying unit identifies another position of another image in the second content based on the position of the first image in the first content, the another image being substantially the same as a second image of the first content.

4. A content switching apparatus according to claim 1, wherein the definition information defines offsets of a plurality of positions in the second content corresponding to a plurality of positions in the first content.

5. A content switching apparatus according to claim 1, wherein the position identifying unit identifies the position by image matching between the first image and an image in the second content.

6. A content switching apparatus according to claim 5, wherein on the assumption that the position of the first image in the first content is A seconds (A>0), the position identifying unit determines a checking range for the image matching from a part A and subsequent seconds in the second content in the case where the time length of the second content is longer than that of the first content, and determines the checking range for the image matching from a part A and preceding seconds in the second content in the case where the time length of the second content is shorter than that of the first content.

7. A content switching apparatus according to claim 6, wherein the position identifying unit determines the checking range for the image matching from a part A seconds to (A+B) seconds in the second content in the case where the second content is B seconds (B>0) longer than the first content, and
wherein the position identifying unit determines the checking range for the image matching from a part (A−C) seconds to A seconds in the second content in the case where the second content is C seconds (C>0) shorter than the first content.

8. A content switching apparatus according to claim 6, wherein the position identifying unit determines the checking range for the image matching from a part (A−C) seconds to (A−D) seconds in the second content in the case where the second content is C seconds shorter than the first content and a D-second CM (C>D >0) is included between the head of the first content and the first image.

9. A content switching apparatus according to claim 5, further comprising a memory unit which stores the image of the first content which is received by the broadcast receiving unit,
wherein the position identifying unit uses a present image as the first image in the case where the present image of the first content is not a commercial message, and uses the image immediately before a commercial message stored in the storing unit as the first image in the case where the present image of the first content is the commercial message.

10. A content switching method for switching an image of a first content being broadcasted into an image of a second content recorded and including substantially the same image as the first content, the method being executed by a content switching apparatus, the method comprising:
broadcast receiving step of receiving the image of the first content broadcasted through a broadcast signal;
storing step of storing the image of the second content, a length of time of the second content being different than a length of time of the first content or a content configuration of the second content being different than a content configuration of the first content;
request receiving step of receiving a change request from a user to change a play position or a play speed during output of the first content;
identifying step of identifying a position of an image in the second content, the image being substantially the same as a first image of the first content; and
determining step of determining a play starting position to start to play the second content based on the position identified in the position identifying step,
wherein when the change request is received during the output of the first content in the request receiving step, the image of the first content is switched to the image of the second content in the determining step,
wherein the identifying step identifies the position by referring to definition information defining temporal relative positions between the images of the first content and the images of the second content, wherein the first content and the second content each includes a plurality of segments, and wherein the definition information defines correspondence of a starting time of each segment between the first and second contents.

11. A content switching method according to claim 10, wherein in accordance with the first content is selected for viewing the image of the second content is received from a server through a network, and stored in the storing step.

12. A content switching method according to claim 10, wherein the position identifying step includes the step of identifying another position of another image in the second content based on the position of the first image in the first content in the case where the second content has no image substantially the same as the first image, the another image being substantially the same as a second image of the first content.

13. A content switching method according to claim 10, wherein the definition information defines offsets of a plurality of positions in the second content corresponding to a plurality of positions in the first content.

14. A content switching method according to claim 10, wherein the position identifying step identifies the position by image matching between the first image and an image in the second content.

15. A content switching method according to claim 14, wherein on the assumption that the position of the first image in the first content is A seconds (A>0), the position identifying step determines a checking range for the image matching from a point A and subsequent seconds in the second content in the case where the time length of the second content is longer than that of the first content, and determines the checking range for the image matching from a point A and preceding seconds in the second content in the case where the time length of the second content is shorter than that of the first content.

16. A content switching method according to claim 15, wherein the position identifying step determines the checking range for the image matching from a part A seconds to (A+B) seconds in the second content in the case where the second content is B seconds (B>0) longer than the first content, and wherein the position identifying step determines the checking range for the image matching from a part (A–C) seconds to A seconds in the second content in the case where the second content is C seconds (C>0) shorter than the first content.

17. A content switching method according to claim 15, wherein the position identifying step determines the checking range for the image matching from a part (A–C) seconds to (A–D) seconds in the second content in the case where the second content is C seconds shorter than the first content and a D-second CM (C>D>0) is included between the head of the first content and the first image.

18. A content switching method according to claim 15, further comprising a memorizing step of memorizing the image of the first content which is received in the broadcast receiving step,
wherein the position identifying step uses a present image as the first image in the case where the present image of the first content is not a commercial message, and uses the image immediately before a commercial message stored in the storing step as the first image in the case where the present image of the first content is the commercial message.

19. A content switching apparatus for switching an image of a first content being broadcasted into an image of a second content recorded and including substantially the same image as the first content, comprising:
a broadcast receiving unit which receives the image of the first content broadcasted through a broadcast signal;
a request receiving unit which receives a change request from a user to change a play position or a play speed during output of the first content;
a position identifying unit which identifies a position of an image in the second content, the image being substantially the same as a first image of the first content; and
a play control unit which determines a play starting position to start to play the second content based on the position identified by the position identifying unit,
wherein when the request receiving unit receives the change request during the output of the first content, the play control unit switches the image of the first content to the image of the second content,
wherein in the case where the second content has no image substantially the same as the first image, the position identifying unit identifies another position of another image in the second content based on the position of the first image in the first content, the another image being substantially the same as a second image of the first content,
wherein the position identifying unit identifies the position by referring to definition information defining temporal relative positions between the images of the first content and the images of the second content, wherein the first content and the second content each includes a plurality of segments, and wherein the definition information defines correspondence of a starting time of each segment between the first and second contents.

20. A content switching apparatus according to claim 1, wherein when the change request from a user, received by the request receiving unit, corresponds to a skip back or skip ahead of a specific amount of time, the position identifying unit identifies a position of an image in the second content that corresponds to a second play position of the first content by referring to the definition information, the second play position of the first content being the specific amount of time before or after the play position of the first content based on the change request.

21. A content switching apparatus according to claim 1, wherein in the case where there is no segment in the second content that corresponds to the segment in the first content in which the first image is located, the position identifying unit identifies the position of an image in the second content that corresponds to an image at a beginning of a next segment in the first content by referring to the definition information, the next segment in the first content following the segment in which the first image is located.

22. A content switching method according to claim 10, wherein when the change request from a user, received during the request receiving step, corresponds to a skip back or skip ahead of a specific amount of time, the position identifying step identifies a position of an image in the second content that corresponds to a second play position of the first content by referring to the definition information, the second play position of the first content being the specific amount of time before or after the play position of the first content based on the change request.

23. A content switching method according to claim 10, wherein in the case where there is no segment in the second content that corresponds to the segment in the first content in which the first image is located, the identifying step identifies the position of an image in the second content that corresponds to an image at a beginning of a next segment in the first content by referring to the definition information, the next segment in the first content following the segment in which the first image is located.

* * * * *